US009156945B2

(12) United States Patent
Watterson et al.

(10) Patent No.: US 9,156,945 B2
(45) Date of Patent: Oct. 13, 2015

(54) MIXED ORGANIC AND INORGANIC POLYMERS

(71) Applicants: University of Massachusetts, Boston, MA (US); The United States of America as represented by the Secretary of the Army, Washington, DC (US)

(72) Inventors: Arthur C. Watterson, Lowell, MA (US); Ravi Mosurkal, Natick, MA (US); Jayant Kumar, Lowell, MA (US); Virinder S. Parmar, Lowell, MA (US); Lynne A. Samuelson, Natick, MA (US); Rajesh Kumar, Lowell, MA (US); Vincent B. Tucci, Lowell, MA (US)

(73) Assignees: University of Massachusetts, Boston, MA (US); The United States of America, as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/894,173

(22) Filed: May 14, 2013

(65) Prior Publication Data

US 2014/0088270 A1 Mar. 27, 2014

Related U.S. Application Data

(62) Division of application No. 12/677,460, filed as application No. PCT/US2008/010567 on Sep. 10, 2008, now abandoned.

(60) Provisional application No. 60/993,139, filed on Sep. 10, 2007.

(51) Int. Cl.
*C08G 77/24* (2006.01)
*C08G 69/48* (2006.01)
*C08G 77/445* (2006.01)
*C08G 77/455* (2006.01)

(52) U.S. Cl.
CPC .............. *C08G 69/48* (2013.01); *C08G 77/445* (2013.01); *C08G 77/455* (2013.01)

(58) Field of Classification Search
CPC ..... C08G 77/445; C08G 77/455; C08G 69/48
USPC .......................................................... 528/28
See application file for complete search history.

(56) References Cited

U.S. PATENT DOCUMENTS

| | | | |
|---|---|---|---|
| 4,973,645 A | 11/1990 | Lee | |
| 6,451,381 B2 * | 9/2002 | Nakamura et al. | 427/387 |
| 6,887,580 B2 * | 5/2005 | Tokuhisa et al. | 428/473.5 |
| 7,321,011 B2 * | 1/2008 | Lu et al. | 524/588 |
| 2004/0166333 A1 * | 8/2004 | Byrd et al. | 428/447 |
| 2005/0261456 A1 * | 11/2005 | Akiba et al. | 528/26 |
| 2008/0096027 A1 * | 4/2008 | Byrd et al. | 428/429 |
| 2009/0111050 A1 * | 4/2009 | Naiini et al. | 430/283.1 |

OTHER PUBLICATIONS

Notification of Transmittal of the International Search Report and the Written Opinion of the International Searching Authority, or the Declaration, for PCT/US2008/010567, "Mixed Organic and Inorganic Polymers" mailed Mar. 6, 2009, 14 pages.
Notification Concerning Transmittal of International Preliminary Report on Patentability, for PCT/US2008/010567, "Mixed Organic and Inorganic Polymers" mailed Mar. 25, 2010, 9 pages.
Kumar, R., et al., "Biocatalytic Synthesis of Highly Flame Retardant Inorganic-Organic Hybrid Polymers", Adv. Mater., 16(17): 1515-1520 (2004).

* cited by examiner

*Primary Examiner* — Margaret Moore
(74) *Attorney, Agent, or Firm* — Hamilton, Brook, Smith & Reynolds, P.C.

(57) ABSTRACT

A polymer is characterized by a repeat unit represented by Structural Formula (I):

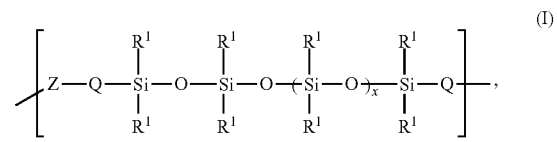

or a copolymer thereof. A crosslinked polymer characterized by a repeat unit represented by Structural Formula (II), (III), (IV) or (V):

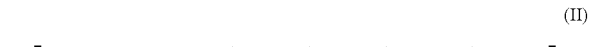

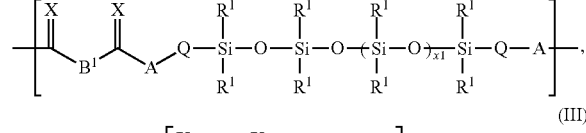

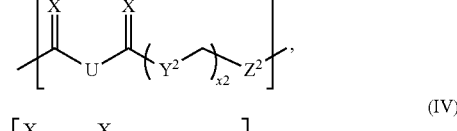

and

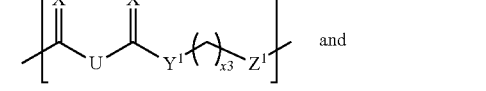

or a copolymer thereof, wherein at least one such repeat unit of a first polymer strand is crosslinked with at least one repeat unit of a second polymer strand by at least one bridging unit, the first and second polymer strands and the repeat unit being components of the crosslinked polymer.

15 Claims, 17 Drawing Sheets

MIXED ORGANIC AND INORGANIC POLYMERS

RELATED APPLICATIONS

This application is a divisional of U.S. application Ser. No. 12/677,460, now abandoned, filed Jan. 18, 2011, which is the U.S. National Stage of International Application No. PCT/US2008/010567, filed on Sep. 10, 2008, which designates the U.S., published in English, which claims the benefit of U.S. Provisional Application No. 60/993,139, filed on Sep. 10, 2007. The entire teachings of the above application(s) are incorporated herein by reference.

BACKGROUND OF THE INVENTION

Polymers, such as polyorganosilicones and polyesters, can be found in every corner of today's society due to their excellent mechanical and chemical properties. Polyorganosilicones, including polysilanes and polycarbosiloxanes, have interesting properties such as photo-conductivity and luminescence, and possess high thermal stability at the same time. See, e.g., Chojnowski et al., Polymer Preprints, 42, 227 (2001); Interrante et al., Polymer Preprints, 42, 225 (2001); Zhong et al., Langmuir, 16, 10369 (2000); and Bruma et al., J. Macromol. Sci. Polymer Reviews, C41, 1 (2001). Polyesters, on the other hand, because of their degradability, can be used in biomedical applications such as sustained-release drug delivery. See, e.g., Kopecek et al., J. Biomed. Mater. Res. Symp., 1, 43 (1971).

There is a need for developing new polymers, such as polyorganosilicones and polyesters, in particular ones having, for example, improved thermal and/or flame retardant properties.

SUMMARY OF THE INVENTION

In one embodiment, the invention is directed to a polymer characterized by a repeat unit represented by Structural Formula (I):

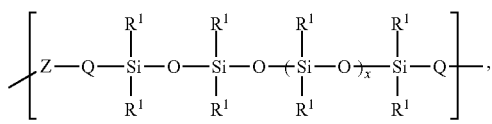

(I)

or a copolymer thereof.

Each Q is an optionally substituted alkylene group that is optionally interrupted with one or more heteroatoms selected from the group consisting of oxygen and sulfur. Preferably, each Q is an alkylene group that is optionally interrupted with one or more heteroatoms selected from the group consisting of oxygen and sulfur.

Z is $-N(R^2)-C(O)-T^1$-G-E-G-$T^2$-C(O)$-N(R^2)-$ or $-X^1-B^1-X^2-$. In some specific embodiments, Z is $-NR^2-C(O)-T^1$-G-$T^2$-C(O)$-NR^2-$, $-NR^2-C(O)$-G-$T^2$-C(O)$-NR^2-$, $-NR^2-C(O)-T^1$-G-C(O)$-NR^2-$, $-NR^2-C(O)$-G-C(O)$-NR^2-$, $-NR^2-C(O)-T^1$-E-$T^2$-C(O)$-NR^2-$, $-NR^2-C(O)-T^1$-G-$T^2$-C(O)$-NR^2-$, $-NR^2-C(O)-T^1$-G-E-G-$T^2$-C(O)$-NR^2-$, $-NR^2-C(O)-T^1$-G-E-$T^2$-C(O)$-NR^2-$, $-NR^2-C(O)-T^1$-E-G-$T^2$-C(O)$-NR^2-$ or $-X^1-B^1-X^2-$, wherein each of $T^1$, $T^2$, E and G independently is other than a covalent bond.

Each G independently is a covalent bond, an optionally substituted aryl ring group, an optionally substituted heteroaryl ring group, an optionally substituted non-aromatic hydrocarbyl ring group, or an optionally substituted non-aromatic heterocyclic ring group.

E is a covalent bond, $-O-$, $-S-$, R', $-O-R'-O-$, $-S-R'-S-$, $-C(O)-$, $-N(R)-$, $-N(R)C(O)-$ or $-N(R)C(S)-$. In some embodiments, E is a covalent bond, $-O-$, R' (e.g., hydrocarbylene optionally substituted with halogen, lower alkyl or lower haloalkyl, such as $-C(CF_3)_2-$), $-O-R'-O-$ or $-C(O)-$.

Each of $T^1$ and $T^2$ independently is a covalent bond or an alkylene group, or, taken together with $N(R^2)-C(O)-$, forms a 5-14 membered non-aromatic heterocyclic group, provided that when both of $T^1$ and $T^2$ are covalent bond, at least one G is other than a covalent bond.

$B^1$ is an optionally substituted alkylene group that is optionally interrupted with one or more heteroatoms selected from the group consisting of oxygen and sulfur, or an optionally substituted aryl group.

Each of $X^1$ and $X^2$ independently is O, S or NR.

Each R independently is $-H$, an optionally substituted alkyl group or an optionally substituted aryl group.

Each R' independently is an optionally substituted hydrocarbylene group.

Each $R^1$ independently is $-H$, an optionally substituted alkyl group, an optionally substituted alkoxy group, an optionally substituted aryloxy group, or an optionally substituted aryl group.

Each $R^2$ independently is $-H$, an optionally substituted alkyl group or an optionally substituted alkylcarbonyl group, or each $R^2$ independently, taken together with the nitrogen atom and the carbonyl group of $-C(O)-N(R^2)-$, and together with $T^1$ or $T^2$, forms a 5-14 membered non-aromatic heterocyclic group optionally fused with G when G is other than a covalent bond.

Each x is an integer of 1-50, such as an integer of 4-50 or 4-10, 10-30 or 10-20.

In another embodiment, the invention is directed to a crosslinked polymer characterized by a repeat unit represented by Structural Formula (II), (III), (IV) or (V):

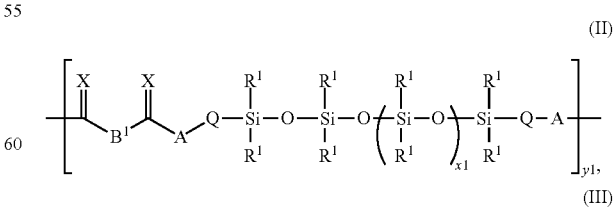

(II)

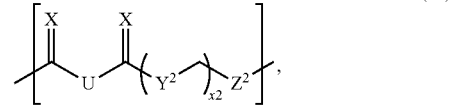

(III)

-continued

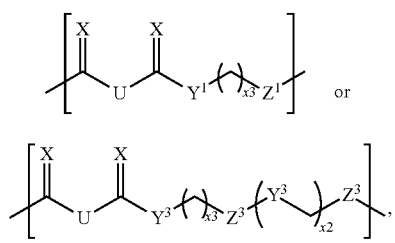

or a copolymer thereof. At least one such repeat unit of a first polymer strand is crosslinked with at least one repeat unit of a second polymer strand by at least one bridging unit, the first and second polymer strands and the repeat unit being components of the crosslinked polymer.

Each X independently is O or S.

Each A independently is O or NR.

Each Q is an optionally substituted alkylene group that is optionally interrupted with one or more heteroatoms selected from the group consisting of oxygen and sulfur.

Each $R^1$ independently is —H, an optionally substituted alkyl group, an optionally substituted alkoxy group, an optionally substituted aryloxy group, or an optionally substituted aryl group. Preferably, each Q is an alkylene group that is optionally interrupted with one or more heteroatoms selected from the group consisting of oxygen and sulfur.

Each R independently is —H, an optionally substituted alkyl group or an optionally substituted aryl group.

$B^1$ is an optionally substituted alkylene group that is optionally interrupted with one or more heteroatoms selected from the group consisting of oxygen and sulfur, or an optionally substituted aryl group.

Each U independently is an optionally substituted alkylene group that is optionally interrupted with one or more heteroatoms selected from the group consisting of oxygen and sulfur, or an optionally substituted aryl group.

Each of $Y^1$, $Y^2$ and $Y^3$, independently, is O, S, NR.

Each of $Z^1$, $Z^2$ and $Z^3$, independently, is O, S, NR.

Each of x1, x2 and x3, independently, is an integer of 1 to 50, such as an integer 4-50 or 4-10, 10-30 or 10-20.

Some specific embodiments of the polymer of Structural Formula (I) include a polymer characterized by a repeat unit represented by a structural formula of Structural Formulas (VI)-(XIV):

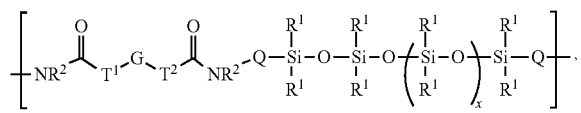

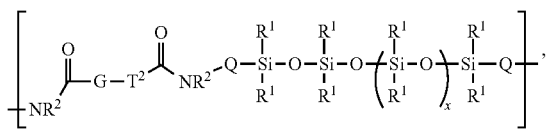

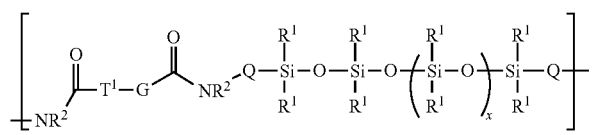

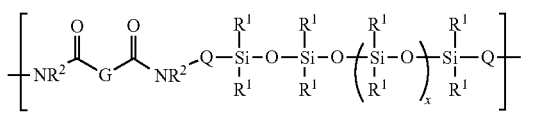

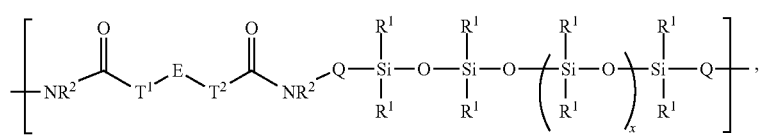

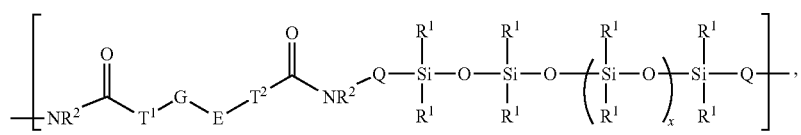

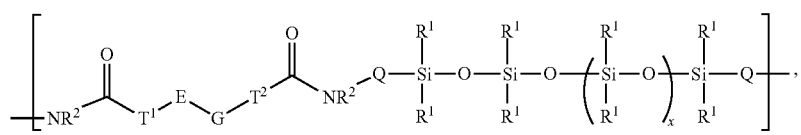

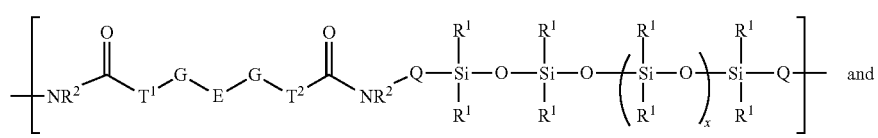

and

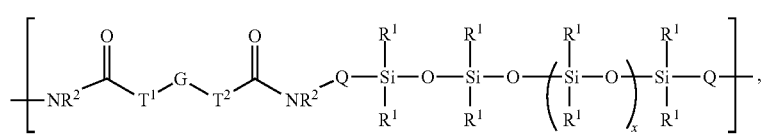

or a copolymer thereof, wherein values of the variables of Structural Formula (VI)-(XIV) are each independently as described above for Structural Formula (I), and wherein each of G, T¹ and T² independently is other than a covalent bond.

Other specific embodiments of the polymer of Structural Formula (I) include a polymer characterized by a repeat unit represented by a structural formula selected from Structural Formulas (XV)-(XX):

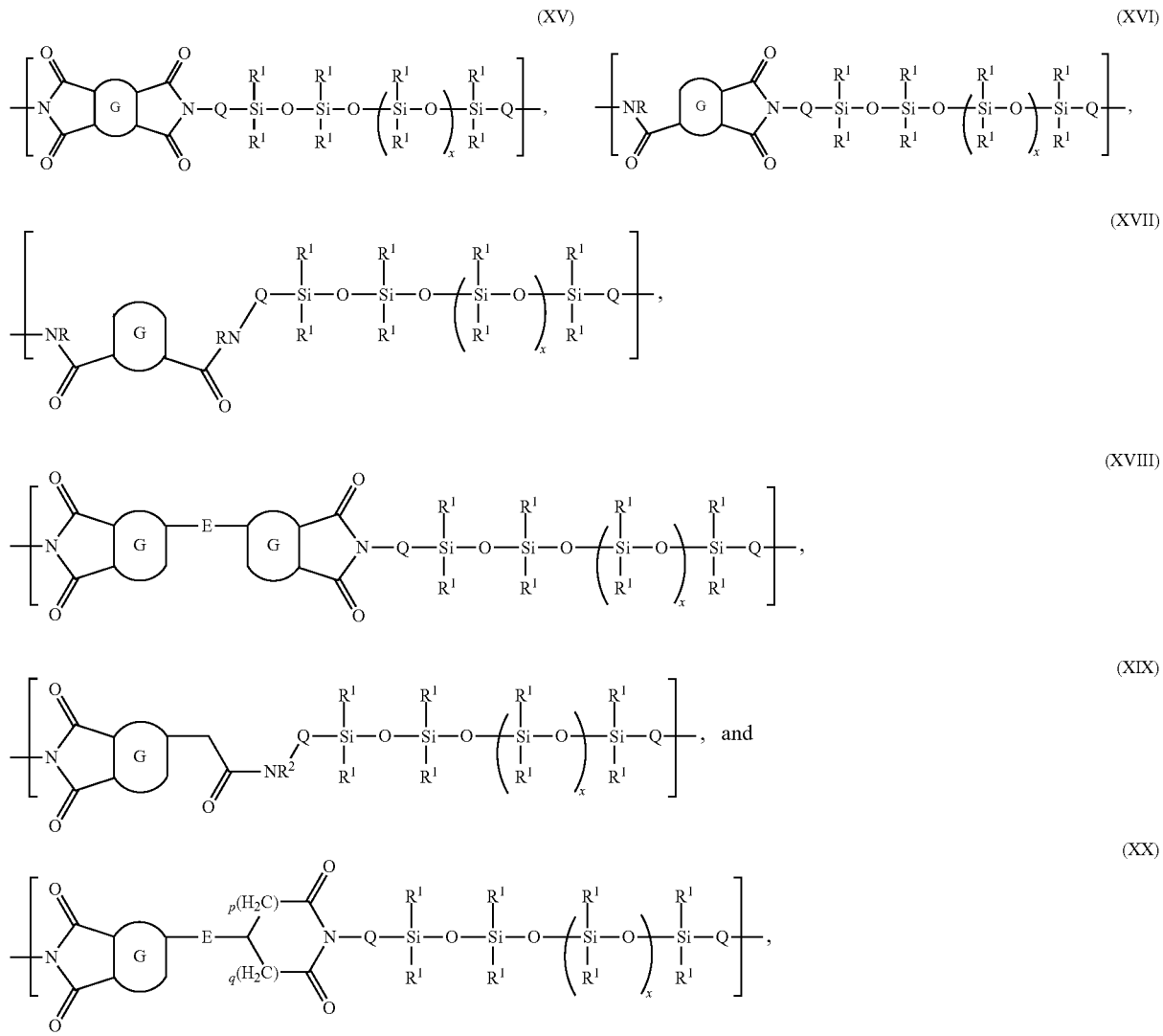

or a copolymer thereof, wherein values of the variables of Structural Formulas (XV)-(XX) are each independently as described above for Structural Formula (I).

Other specific embodiments of the polymer of Structural Formula (I) include a polymer characterized by a repeat unit represented by a structural formula selected from Structural Formulas (XXa-XXc):

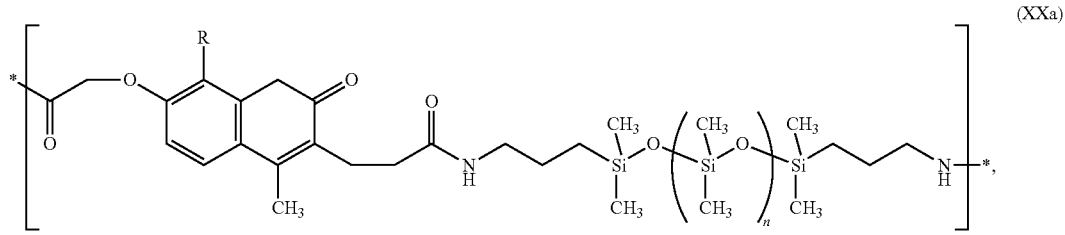

wherein R is H or CH₃;

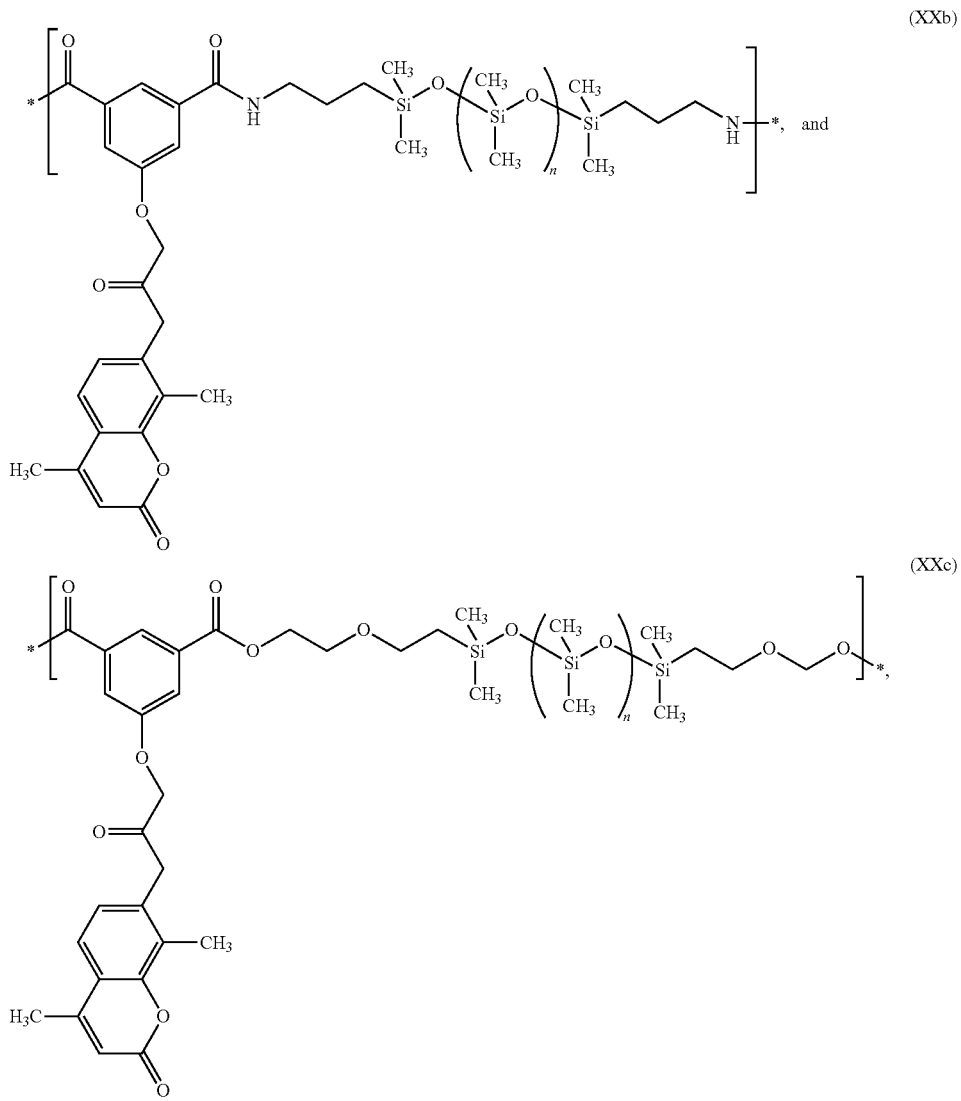

or a copolymer thereof, wherein values of the variables of Structural Formulas (XXa)-(XXc) are each independently as described above for Structural Formula (I).

Other specific embodiments of the polymer of Structural Formula (I) include a polymer characterized by a repeat unit represented by a structural formula selected from Structural Formulas (XXI)-(XXVIII):

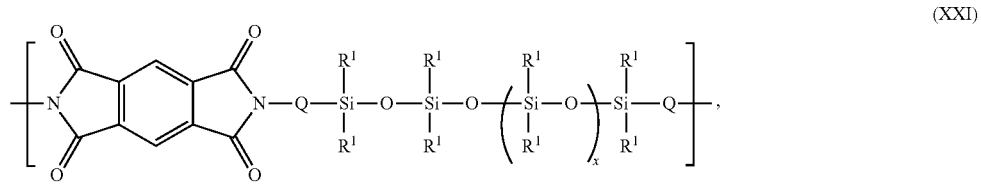

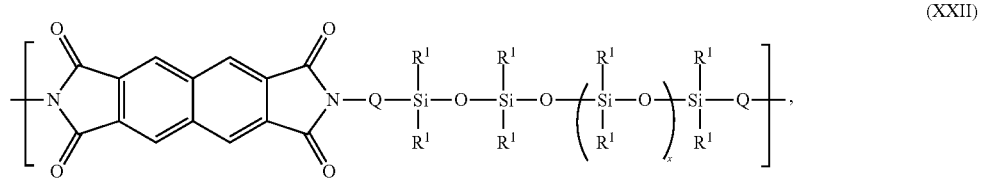

(XXIII)
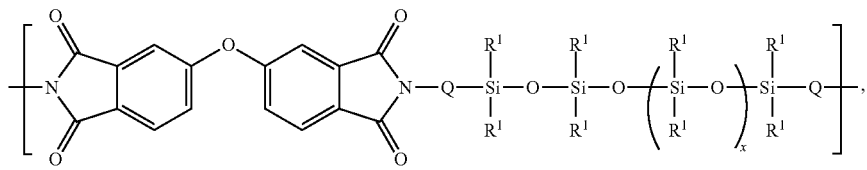

(XXIV)
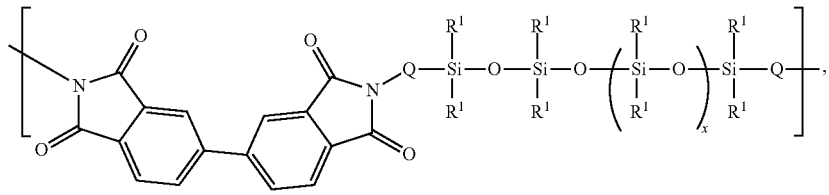

(XXV)
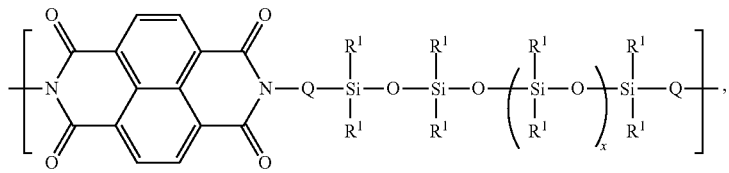

(XXVI)
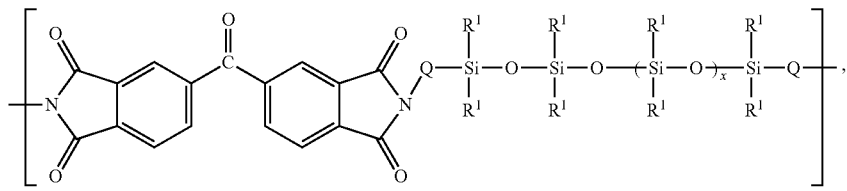

(XXVII)
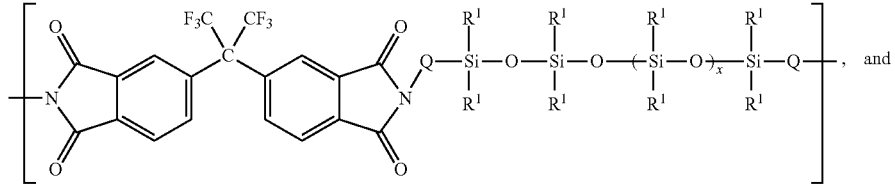
, and (XXVIII)
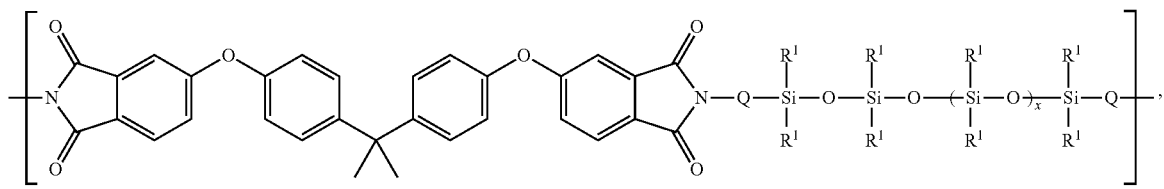

or a copolymer thereof, wherein values of the variables of Structural Formulas (XXI)-(XXVIII) are each independently as described above for Structural Formula (I).

Other specific embodiments of the polymer of Structural Formula (I) include a polymer characterized by a repeat unit represented by Structural Formula (XXIX):

(XXIX)
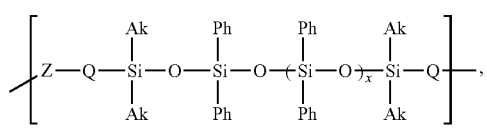

or a copolymer thereof, wherein values of the variables of Structural Formula (XXIX) are each independently as described above for Structural Formula (I).

In yet some embodiments, the polymers of Structural Formulas (I)-(XXIX) include the repeat units in a range of between 1 and 10,000, such as between 1,000 and 10,000, between 1,000 and 5,000, or between 5,000 and 10,000.

Some more specific embodiments of the polymer of Structural Formula (I) include a polymer characterized by a repeat unit represented by Structural Formula (XXXA) or (XXXB):

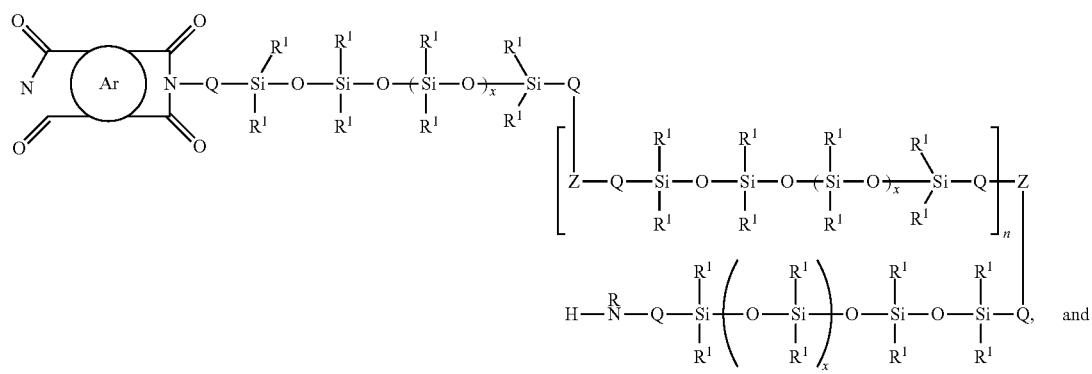

(XXXA)

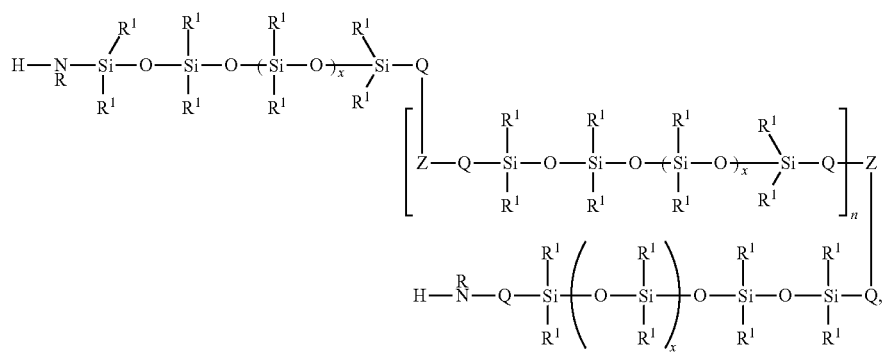

(XXXB)

wherein Ar is:

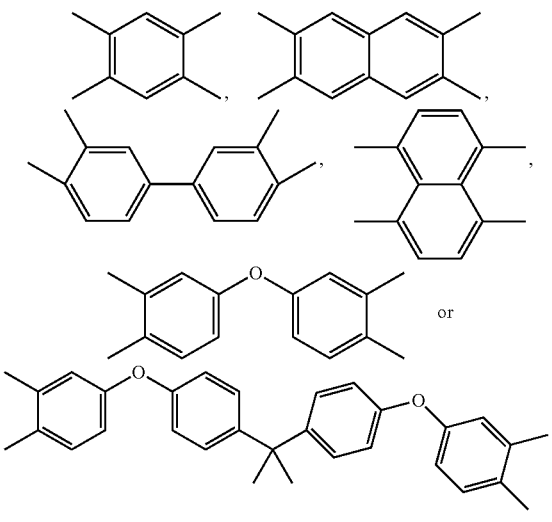

and n is an integer of 1 to 10,000, such as between 1,000 and 10,000, between 1,000 and 5,000, or between 5,000 and 10,000. Values of the variables of Structural Formula (XXXA) or (XXXB) are each independently as described above for Structural Formula (I). Preferably, R is —H, phenyl, benzyl, or an optionally substituted alkyl group. Alternatively, R is —H or an optionally substituted alkyl group. Alternatively, R is —H or an alkyl group.

In yet some embodiments, the polymers of Structural Formulas (I), (VI)-(XXXA) and (XXXB) are crosslinked with at least one crosslinking agent. In some specific embodiments, the polymers are crosslinked at a component of Z, such as G or $B^1$. In some further specific embodiments, the polymers are crosslinked at a component of Z, wherein at least one of G or $B^1$ is other than a covalent bond, and wherein two G groups, or two $B^1$ groups, of a first polymer strand and a second polymer strand are crosslinked together by a bridging unit.

Some specific embodiments of the polymer of Structural Formula (II) include a polymer characterized by a repeat unit represented by Structural Formulas (XXXI):

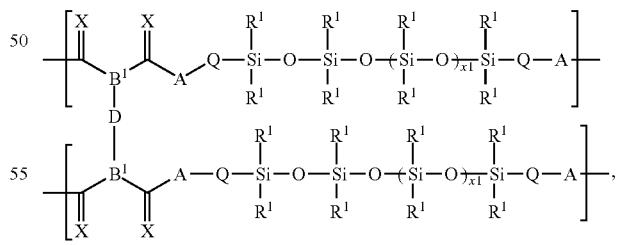

(XXXI)

or a copolymer thereof, wherein D is a bridging unit which connects $B^1$ of a first polymer strand to $B^1$ of a second polymer strand, and is formed from the crosslinking between $B^1$ and the crosslinking agent and wherein D is selected from: an alkylene group, an alkylene bis(cycloalkyl) group, a bis(alkyl)amine group, a diaminoalkylene group, a diacylalkylene group, a diacylarene group, an oxyalkylene group, an alkylene

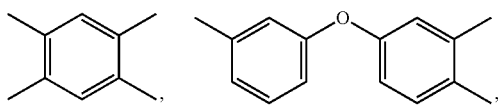

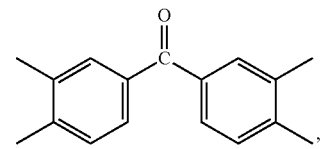

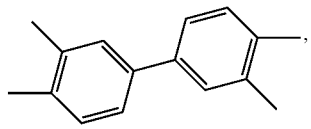

bis(carbamoyl) group,

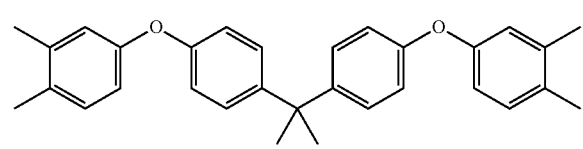

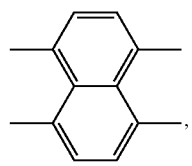

terephthalic acid, isophthalic acid, an ester of terephthalic acid or an ester of isophthalic acid. In another embodiment D is selected from the group consisting of: —(CH$_2$)$_r$—, —CH$_2$—CH(OH)—CH$_2$—, —C(O)CH$_2$CH$_2$C(O)—, —HN—(CH$_2$)$_r$—, —HN—(CH$_2$), NH—, —CH$_2$—CH(OH)—O—(CH$_2$)$_s$—O—CH(OH)—CH$_2$—, —(C$_6$H$_{10}$)—(CH$_2$)$_s$—(C$_6$H$_{10}$)—, —C(O)—(C$_6$H$_2$(COOH)$_2$)—C(O)—, —C(O)NH(CH$_2$)$_r$NHC(O)—, —O—CH$_2$C(O)—O—(CH$_2$CH$_2$—O)$_u$— and —(OCH$_2$CH$_2$)$_t$—, wherein:

each r independently is, an integer from 2 to 20;

each s independently is an integer from 1 to 4;

each t independently is an integer from 1 to 100; and each u independently is an integer from 1 to 1,000. In another embodiment, D is selected from the group consisting of —(CH$_2$)—, —NH—CH$_2$—NH— and —(CH$_2$)—NH—. Values of the variables of Structural Formula (XXXI) are each independently as described above for Structural Formula (II).

Some specific embodiments of the polymer of Structural Formula (III) include a polymer characterized by a repeat unit represented by Structural Formulas (XXXII):

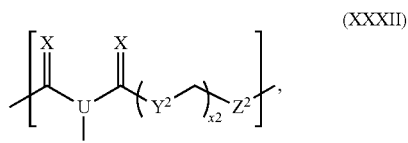

or a copolymer thereof, wherein D is a bridging unit which connects U of a first polymer strand to U of a second polymer strand, and is formed from the crosslinking between U and the crosslinking agent. Values of the variables of Structural Formula (XXXII) are each independently as described above for Structural Formula (III).

Some specific embodiments of the polymer of Structural Formula (IV) include a polymer characterized by a repeat unit represented by Structural Formulas (XXXIII):

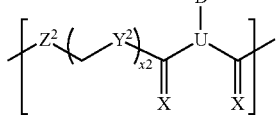

or a copolymer thereof, wherein D is a bridging unit which connects U of a first polymer strand to U of a second polymer strand, and is formed from the crosslinking between U and the crosslinking agent. Values of the variables of Structural Formula (XXXIII) are each independently as described above for Structural Formula (IV).

Some specific embodiments of the polymer of Structural Formula (V) include a polymer characterized by a repeat unit represented by Structural Formulas (XXXIV):

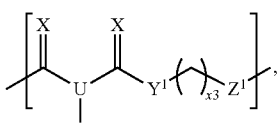

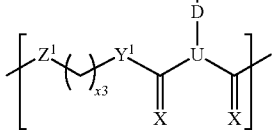

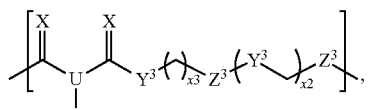

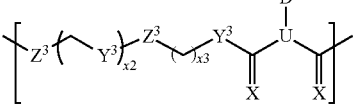

or a copolymer thereof, wherein D is, as defined above, a bridging unit which connects U of a first polymer strand to U of a second polymer strand, and is formed from the crosslinking between U and the crosslinking agent. Values of the variables of Structural Formula (XXXIV) are each independently as described above for Structural Formula (V).

In some specific embodiments, the crosslinked polymers of Structural Formula (II) are represented by Structural Formula (XXXV):

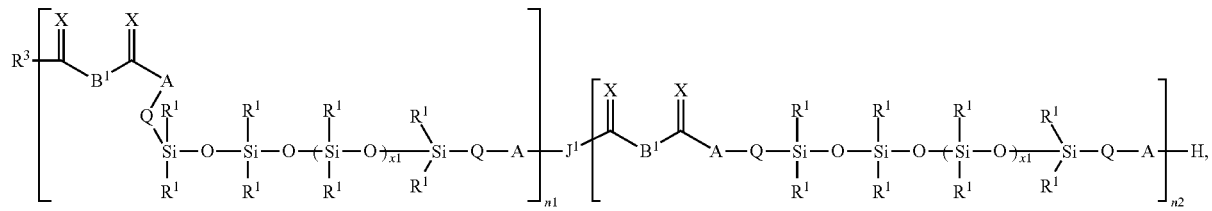
(XXXV)

wherein J¹ is represented by Structural Formula (XXXVI):

(XXXVI)

R³ is hydroxy or an alkoxy group, specifically hydroxy or a lower alkoxy group. Each of n1 and n2 independently is zero or an integer of 1 to 10,000, such as between 1 and 5,000, between 1,000 and 10,000, between 1,000 and 5,000, or between 5,000 and 10,000. Each y1 and y2 independently is an integer of 1 to 10,000, such as between 1 and 5,000, between 1,000 and 10,000, between 1,000 and 5,000, or between 5,000 and 10,000. Values of the other remaining variables of Structural Formulas (XXXV) and (XXXVI) are each independently as described above for Structural Formula (II).

In some specific embodiments, the crosslinked polymers of Structural Formula (III) are represented by Structural Formula (XXXVII):

(XXXVII)

wherein J² is represented by Structural Formula (XXXVIII):

(XXXVIII)

Each of R⁴ and R⁵ independently is H, hydroxy, amino, alkoxy, aryl or aryloxy. Specifically, each of R⁴ and R⁵ independently is H, hydroxy, amino, lower alkoxy, phenyl or phenyloxy. Each n1 and n2 independently is zero or an integer of 1 to 10,000, such as between 1 and 5,000, between 1,000 and 10,000, between 1,000 and 5,000, or between 5,000 and 10,000. Each y1 and y2 independently is an integer of 1 to 10,000, such as between 1 and 5,000, between 1,000 and 10,000, between 1,000 and 5,000, or between 5,000 and 10,000. Other remaining values of Structural Formulas (XXXVII) and (XXXVIII) are each independently as described above for Structural Formula (III).

In some specific embodiments, the crosslinked polymers of Structural Formula (IV) are represented by Structural Formula (XXXIX):

(XXXIX)

wherein J³ is represented by Structural Formula (XXXX):

(XXXX)

Each of R⁴ and R⁵ independently is H, hydroxy, amino, alkoxy, aryl or aryloxy. Specifically, each of R⁴ and R⁵ independently is H, hydroxy, amino, lower alkoxy, phenyl or phenyloxy. Each n1 and n2 independently is zero or an integer of 1 to 10,000, such as between 1 and 5,000, between 1,000 and 10,000, between 1,000 and 5,000, or between 5,000 and 10,000. Each y1 and y2 independently is an integer of 1 to 10,000, such as between 1 and 5,000, between 1,000 and 10,000, between 1,000 and 5,000, or between 5,000 and 10,000. Other remaining values of Structural Formulas (XXXIX) and (XXXX) are each independently as described above for Structural Formula (IV).

In some specific embodiments, the crosslinked polymers of Structural Formula (V) are represented by Structural Formula (XXXXI):

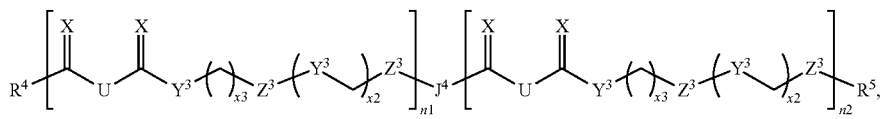

(XXXXI)

wherein J⁴ is represented by Structural Formula (XXXXII):

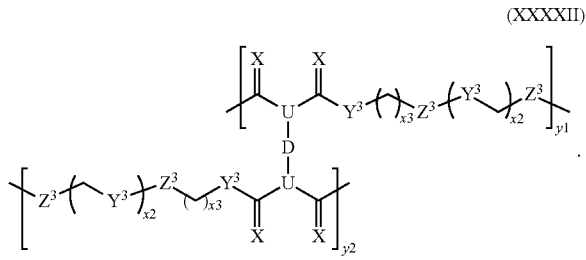

(XXXXII)

Each of $R^4$ and $R^5$ independently is H, hydroxy, amino, alkoxy, aryl or aryloxy. Specifically, each of $R^4$ and $R^5$ independently is H, hydroxy, amino, lower alkoxy, phenyl or phenyloxy. Each n1 and n2 independently is zero or an integer of 1 to 10,000, such as between 1 and 5,000, between 1,000 and 10,000, between 1,000 and 5,000, or between 5,000 and 10,000. Each y1 and y2 independently is an integer of 1 to 10,000, such as between 1 and 5,000, between 1,000 and 10,000, between 1,000 and 5,000, or between 5,000 and 10,000. Other remaining values of Structural Formulas (XXXXI) and (XXXXII) are each independently as described above for Structural Formula (V).

In some specific embodiments, the crosslinked polymers of Structural Formula (II) are represented by Structural Formula (XXXXIII):

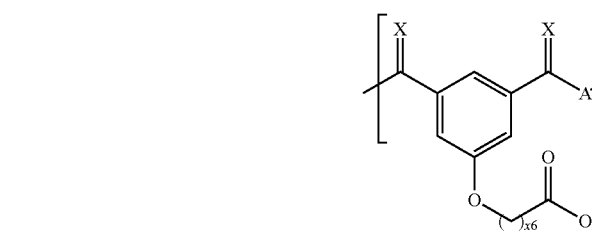

(XXXXIII)

or a copolymer thereof. At least one such repeat unit of a first polymer strand is crosslinked with at least one repeat unit of a second polymer strand by at least one bridging unit, the first and second polymer strands and the repeat unit being components of the crosslinked polymer. Each Ak is an alkyl group. Each Ph is a phenyl group.

Values of the other remaining variables of Structural Formula (XXXXIII) are each independently as described above for Structural Formula (II).

In yet another embodiment, the invention is directed to a polymer characterized by a repeat unit represented by Structural Formula (XXXXIV):

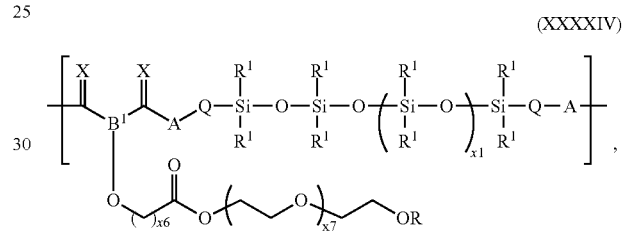

(XXXXIV)

or a copolymer thereof. x6 is an integer of 1 to 10, such as 1-5. x7 is an integer of 1 to 1,000, such as an integer of 4-500 or 4-100 or 10-50. Values of the other remaining variables of Structural Formula (XXXXIV) are each independently as described above for Structural Formula (II).

In a specific embodiment, the polymers of Structural Formula (XXXXIV) are characterized by a repeat unit represented by Structural Formula (XXXXV):

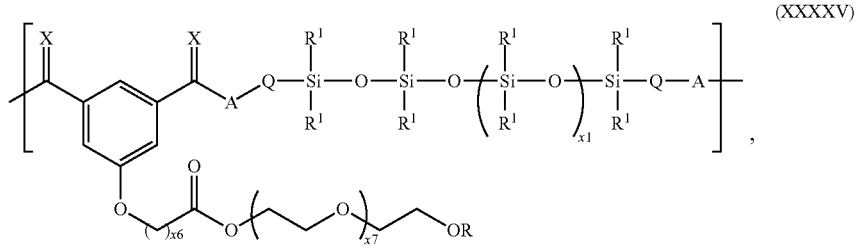

(XXXXV)

or a copolymer thereof. x6 is an integer of 1 to 10, such as 1-5. x7 is an integer of 1 to 1,000, such as an integer of 4-1,000, 4-500 or 4-100 or 10-50. Values of the other remaining variables of Structural Formula (XXXXV) are each independently as described above for Structural Formula (II).

In yet another embodiment, the invention is directed to a compound represented by Structural Formula (XXXXVI):

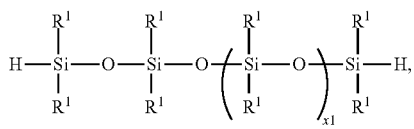

wherein values of the variables of Structural Formula (XXXXVI) are each independently as described above for Structural Formula (I).

In some specific embodiments of the polymers of Structural Formulas (XXXXIV)-(XXXXV), the polymers are crosslinked, and at least one repeat unit of a first polymer strand is crosslinked with at least one repeat unit of a second polymer strand by at least one bridging unit, the first and second polymer strands and the repeat unit being components of the crosslinked polymers.

In some specific embodiments of the polymers of Structural Formulas (II)-(V), (XXXI)-(XXXIV), and (XXXXIII)-(XXXXV), each polymer strand independently includes the repeat units in a range of between 1 and 10,000, such as between 1,000 and 10,000, between 1,000 and 5,000, or between 5,000 and 10,000.

The invention also include a composition that includes a polymer described herein. In some specific embodiments, the composition further includes a fire retardant known in the art, such as rock wool, gypsum boards, cements (e.g., asbestos cement), calcium silicates, fibers (e.g. polybenzimidazole (PBI) fibers, modified acrylic fibers made from acrylonitriles, Pyromex® (Toho Tenax America, Inc.)), polymers, such as Nomex™ (Dupont), carbon foams, lenzing FR®, Carbon X (Chapman Innovation), etc. In other specific embodiments, the composition further includes one or more materials selected from the group consisting of metal oxides (e.g., $TiO_2$, MgO, $Al_2O_3$, etc.), clays (e.g., nano clays), carbon materials (e.g., carbon nanostructures, such as carbon nanotubes (single wall nanotubes (SWNT) or multi-wall nanotubes (MWNT), and fullerines)), and cellulosic derivatives. Without being bound to a particular theory, it is believed that the metal oxides, clays, carbon materials and cellulosic derivatives can enhance (or improve) heat release properties of the polymer.

The invention also relates to enzymatic methods of synthesizing a polymer disclosed herein. Each of the methods includes the steps of mixing monomers, adding an enzyme, e.g., a lipase, esterase, or protease, to the monomer mixture to form a reaction mixture, and reacting the reaction mixture for a time and under polymerizing conditions suitable to obtain the polymer. In some embodiments, the polymer is crosslinked with at least one crosslinking agent to form a crosslinked polymer.

The enzymatic synthetic methods have certain advantages. First, it reduces or eliminates the use of chemical solvents and therefore significantly reduces environmental pollution caused by conventional chemical synthesis of polymers. Second, because of the chemical selectivity of enzymatic synthesis, the amount of reactants (i.e., monomers), which are required to complete a polymerization reaction and to achieve a desired amount of a polymer product, can be precisely controlled to the right stoichiometry. In other words, no excess reactants are needed, which results in lower production costs and is industrially significant. Third, because of the involvement of an enzyme, which requires that the surrounding environment be mild, the polymers that can be prepared by the enzymatic synthesis of this invention are generally biocompatible. As a result, these polymers can be used in a number of biomedical applications such as carriers for controlled drug delivery, tissue engineering, bio-implants, and scaffolds.

In addition, in some embodiments, the crosslinked polymers of the invention, in particular, crosslinked polymers using hexamethylenetetramine as a crosslinker, can have improved thermal and flame retardant properties as compared to the corresponding uncrosslinked polymers.

The polymers, including uncrosslinked and crosslinked polymers, disclosed herein can be used for various applications, including fire-retardant materials, controlled drug deliveries, carriers for bio-implants, bio-degradable matrixes for tissue engineering, packaging materials, various devices (e.g., photovoltaic devices).

The invention also includes compositions, structures, or devices containing one or more of a polymer disclosed herein, and methods of preventing fire by using a fire-retardant that includes one or more polymers of the invention. The fire retardant can further include a fire retardant known in the art.

Unless otherwise defined, all technical and scientific terms used herein have the same meaning as commonly understood by one of ordinary skilled in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
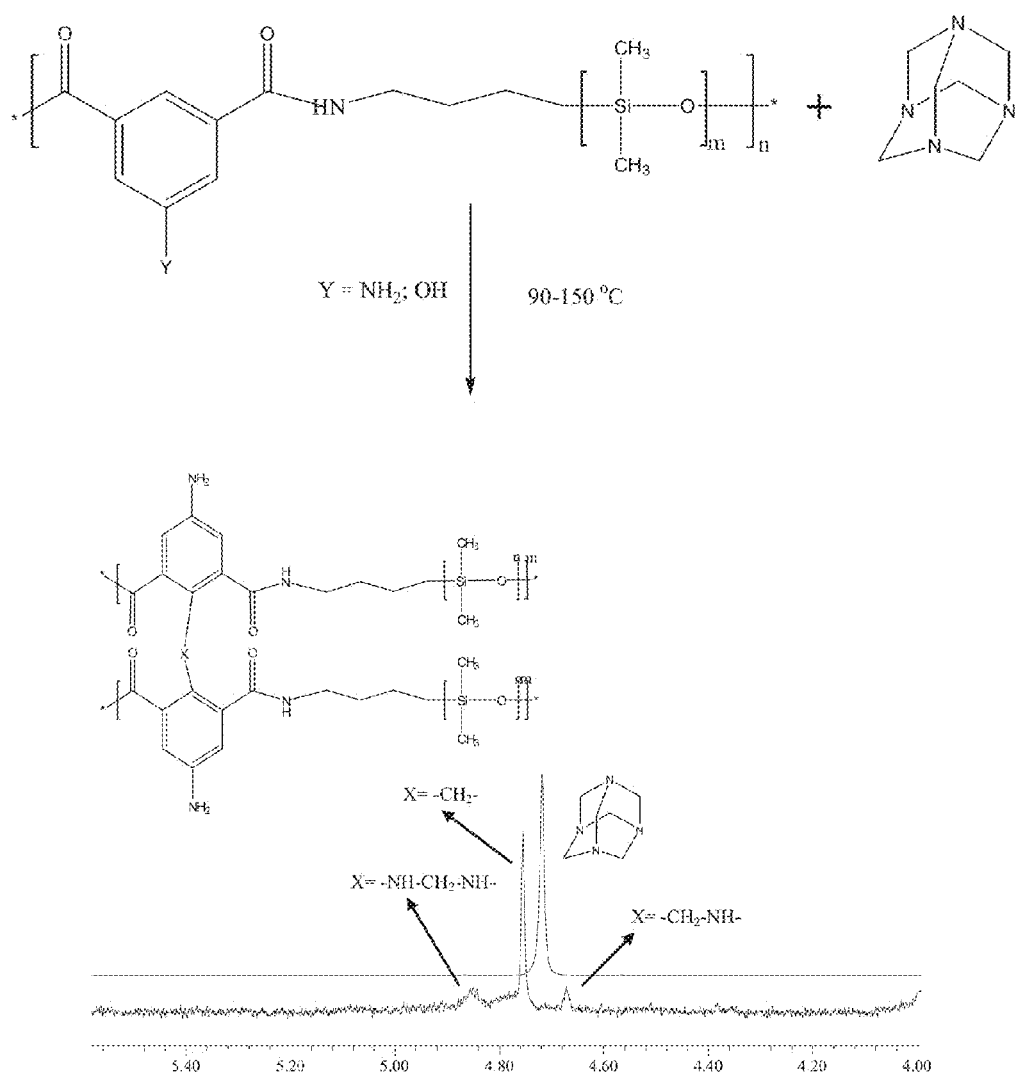
FIG. 1—Crosslinking of siloxane copolyamide with HMTA and the $^1$H NMR spectrum of possible crosslinked products.

A description of example embodiments of the invention follows.

The term "monomer" refers to a molecule that can undergo a polymerization process, e.g., through condensation polymerization or addition polymerization. Specifically, the monomers that can be used to practice the methods of this invention include linear monomers (i.e., non-cyclic, including graft monomers) or cyclic monomers, oligomers, macromers, and mixtures thereof. Each of the monomers, oligomers, and macromers can be monofunctional, bifunctional, trifunctional, or multifunctional. Examples of suitable monomers include, but are not limited to, diacids and diols, diacids and diamines, anhydrides and diols, and anhydrides and diamines.

The term "halo" as used herein means halogen and includes chloro, fluoro, bromo and iodo.

An "aliphatic group" is non-aromatic, consists solely of carbon and hydrogen and may optionally contain one or more units of unsaturation, e.g., double and/or triple bonds. An aliphatic group may be straight chained, branched or cyclic. When straight chained or branched, an aliphatic group typically contains 1-20 carbon atoms, typically 1-12 carbon atoms or 1-10 carbon atoms, more typically 1-6 carbon atoms. When cyclic, an aliphatic group typically contains 3-10 carbon atoms, more typically 3-7 carbon atoms. A "substituted aliphatic group" is substituted at any one or more "substitutable carbon atom". A "substitutable carbon atom" in an aliphatic group is a carbon in an aliphatic group that is bonded to one or more hydrogen atoms. One or more hydrogen atoms can be optionally replaced with a suitable substituent group. A "haloaliphatic group" is an aliphatic group, as defined above, substituted with one or more halogen atoms. Suitable substituents on a substitutable carbon atom of an aliphatic group are the same as those for an alkyl group.

The term "alkyl" used alone or as part of a larger moiety, such as "alkoxy", "haloalkyl", "arylalkyl", "alkylamine", "cycloalkyl", "dialkyamine", "alkylamino", "dialkyamino" "alkylcarbonyl", "alkoxycarbonyl" and the like, includes as used herein means saturated straight-chain, cyclic or branched aliphatic group. Typically, an alkyl group includes 1-20 carbon atoms. In some embodiments, an alkyl group includes 1-12 carbon atoms, specifically, 1-10 carbon atoms. Alternatively, an alkyl group includes 1-6 carbon atoms. As used herein, a C1-C10 alkyl group is referred to "lower alkyl." Similarly, the terms "lower alkoxy", "lower haloalkyl", "lower arylalkyl", "lower alkylamine", "lower cycloalkylalkyl", "lower dialkyamine", "lower alkylamino", "lower dialkyamino" "lower alkylcarbonyl", "lower alkoxycarbonyl" include straight and branched saturated chains containing one to 10 carbon atoms.

The term "alkoxy" means —O-alkyl; "hydroxyalkyl" means alkyl substituted with hydroxy; "aralkyl" means alkyl substituted with an aryl group; "alkoxyalkyl" mean alkyl substituted with an alkoxy group; "alkylamine" means amine substituted with an alkyl group; "cycloalkylalkyl" means alkyl substituted with cycloalkyl; "dialkylamine" means amine substituted with two alkyl groups; "alkylcarbonyl" means —C(O)—R''', wherein R''' is alkyl; "alkoxycarbonyl" means —C(O)—OR''', wherein R''' is alkyl; and where alkyl is as defined above.

The terms "haloalkyl" and "haloalkoxy" means alkyl or alkoxy, as the case may be, substituted with one or more halogen atoms. The term "halogen" means F, Cl, Br or I. Preferably the halogen in a haloalkyl or haloalkoxy is F or Cl.

The term "acyl group" mean —C(O)R''', wherein R''' is an optionally substituted alkyl group or aryl group (e.g., optionally substituted phenyl). R''' is preferably an unsubstituted alkyl group or phenyl.

An "alkylene group" is represented by —[CH$_2$]$_z$—, wherein z is a positive integer, preferably from one to eight, more preferably from one to four.

An "alkenylene group" is an alkylene in which at least a pair of adjacent methylenes are replaced with —CH=CH—.

An "alkynylene group" is an alkylene in which at least a pair of adjacent methylenes are replaced with —C≡C—.

An "hydrocarbyl" group is aromatic or non-aromatic (i.e., aliphatic), and consists solely of carbon and hydrogen and may optionally contain one or more units of unsaturation, e.g., double and/or triple bonds. An hydrocarbyl group may be straight chained, branched or cyclic.

A cyclic, non-aromatic hydrocarbyl group or a non-aromatic hydrocarbyl ring group typically has six-fourteen ring atoms. A "substituted non-aromatic hydrocarbyl ring group" is substituted at any one or more substitutable ring atom. A cyclic, non-aromatic hydrocarbyl group includes monocyclic rings and polycyclic rings (bicyclic, tricyclic or tetracyclic). Examples include cyclo hexyl, cyclo butyl, cyclo octyl, decahydronaphtahlenyl, tetradecahydroanthracenyl, etc.

A "hydrocarbylene" group means a divalent groups formed by removing one more hydrogen atom from a hydrocarbyl group. A hydrocarbylene group typically has six-fourteen ring atoms. In some embodiments, a hydrocarbylene group is straight chained or branched. Alternatively, in some embodiments, a hydrocarbylene group is straight chained. Examples include phenylene (e.g., 1,3-phenylene), methylene, ethylene, naphthalene, etc.

The term "aryl group" used alone or as part of a larger moiety as in "aralkyl", "aralkoxy", or "aryloxyalkyl", means carbocyclic aromatic rings. The term "carbocyclic aromatic group" may be used interchangeably with the terms "aryl", "aryl ring" "carbocyclic aromatic ring", "aryl group" and "carbocyclic aromatic group". An aryl group typically has six-fourteen ring atoms. A "substituted aryl group" is substituted at any one or more substitutable ring atom. The term "C$_{6-14}$aryl" as used herein means a monocyclic, bicyclic, tricyclic or tetracyclic carbocyclic ring system containing from 6 to 14 carbon atoms and includes phenyl, naphthyl, anthracenyl, 1,2-dihydronaphthyl, 1,2,3,4-tetrahydronaphthyl, fluorenyl, indanyl, indenyl and the like. In some embodiments, an aryl group includes phenyl, naphthyl, anthracenyl, 1,2-dihydronaphthyl and 1,2,3,4-tetrahydronaphthyl. In some specific embodiments, phenyl, naphthyl and anthracenyl are employed as an aryl group. A common aryl group is phenyl.

As used herein, the term "phenylalkyl" means a phenyl group that is attached to another group by an alkylene group, such as a C1-C10 alkylene, a C1-C6 alkylene group or a C1-C4 alkylene group. Representative aralkyl groups include benzyl, 2-phenyl-ethyl, naphth-3-yl-methyl and the like. An "lower phenylalkyl group" means a phenyl group that is attached to another group by a C1-C10 alkylene group. Phenylalkyl groups may be optionally substituted with one or more substituents.

The term "heteroaryl", "heteroaromatic", "heteroaryl ring", "heteroaryl group" and "heteroaromatic group", used alone or as part of a larger moiety as in "heteroaralkyl" or "heteroarylalkoxy", refers to aromatic ring groups having five to fourteen ring atoms selected from carbon and at least one (typically 1-4, more typically 1 or 2) heteroatom (e.g., oxygen, nitrogen or sulfur). They include monocyclic rings and polycyclic rings (bicyclic, tricyclic or tetracyclic) in which a monocyclic heteroaromatic ring is fused to one or more other carbocyclic aromatic or heteroaromatic rings. In some embodiment, a heteroaryl group is a "5-14 membered heteroaryl." The "5-14 membered heteroaryl" means a monocyclic, bicyclic or tricyclic ring system containing one or two aromatic rings and from 5 to 14 atoms of which, unless otherwise specified, one, two, three, four or five are heteroatoms independently selected from N, NH, N($C_{1-6}$alkyl), O and S, and includes thienyl, furyl, pyrrolyl, pyrididyl, indolyl, quinolyl, isoquinolyl, tetrahydroquinolyl, benzofuryl, benzothienyl and the like.

Examples of monocyclic heteroaryl groups include furanyl (e.g., 2-furanyl, 3-furanyl), imidazolyl (e.g., N-imidazolyl, 2-imidazolyl, 4-imidazolyl, 5-imidazolyl), isoxazolyl(e.g., 3-isoxazolyl, 4-isoxazolyl, 5-isoxazolyl), oxadiazolyl (e.g., 2-oxadiazolyl, 5-oxadiazolyl), oxazolyl (e.g., 2-oxazolyl, 4-oxazolyl, 5-oxazolyl), pyrazolyl (e.g., 3-pyrazolyl, 4-pyrazolyl), pyrrolyl (e.g., 1-pyrrolyl, 2-pyrrolyl, 3-pyrrolyl), pyridyl (e.g., 2-pyridyl, 3-pyridyl, 4-pyridyl), pyrimidinyl (e.g., 2-pyrimidinyl, 4-pyrimidinyl, 5-pyrimidinyl), pyridazinyl (e.g., 3-pyridazinyl), thiazolyl (e.g., 2-thiazolyl, 4-thiazolyl, 5-thiazolyl), triazolyl (e.g., 2-triazolyl, 5-triazolyl), tetrazolyl (e.g., tetrazolyl) and thienyl (e.g., 2-thienyl, 3-thienyl. Examples of monocyclic six-membered nitrogen-containing heteraryl groups include pyrimidinyl, pyridinyl and pyridazinyl. Examples of polycyclic aromatic heteroaryl groups include carbazolyl, benzimidazolyl, benzothienyl, benzofuranyl, indolyl, quinolinyl, benzotriazolyl, benzothiazolyl, benzoxazolyl, benzimidazolyl, isoquinolinyl, indolyl, isoindolyl, acridinyl, or benzisoxazolyl.

Other examples for the aryl and heteroaryl groups include:

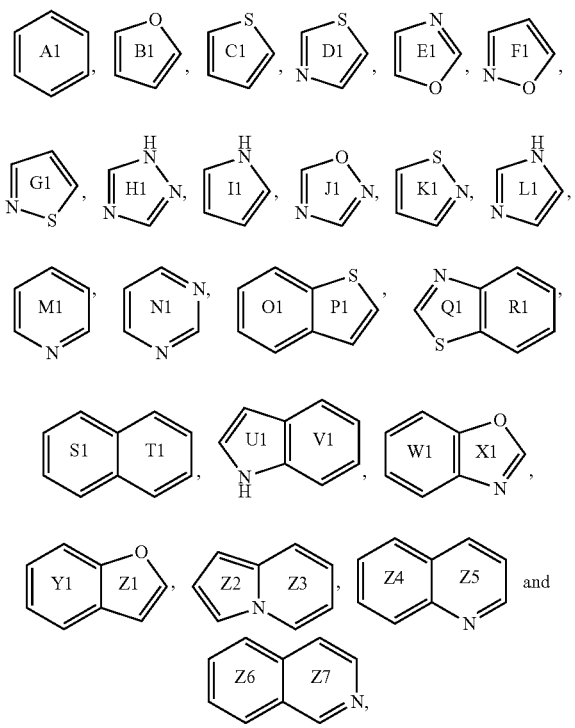

wherein each of rings A1-Z7 is optionally substituted. It is noted that, as shown above, rings O1-Z7 can be attached to their designated atom through any ring carbon of the rings which is not at a position bridging two aryl groups.

The aryl, aryloxy, heteroaryl, heteroaryl, non-aromatic heterocyclic groups, including arylene group, can be optionally substituted with one or more substituents selected from the group consisting of an aryl group optionally substituted with one or more substituents selected from the group consisting of halogen; lower alkyl optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; amino; lower alkylamino; lower dialkylamino; lower alkoxy optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; nitro; cyano; hydroxy; lower haloalkoxy; lower alkoxycarbonyl; lower alkylcarbony; and lower haloalkyl. Specific exemplary substituents include halogen, lower alkyl, amino, lower alkylamino, lower dialkylamino, lower alkoxy, nitro, cyano, hydroxy, lower haloalkoxy, lower alkoxycarbonyl, lower alkylcarbonyl and lower haloalkyl. Alternatively, specific exemplary substituents include halogen, lower alkyl, amino, lower alkylamino, lower dialkylamino, lower alkoxy, hydroxy, lower haloalkoxy and lower haloalkyl. Alternatively, specific exemplary substituents include halogen, lower alkyl, amino, lower alkylamino, lower dialkylamino, lower alkoxy and hydroxy.

The hydrocarbyl (including hydrocarbylene), aliphatic (including alkyl), alkyl carbonyl and alkoxy groups can be optionally substituted with one or more substituents selected from the group consisting of halogen; amino; lower alkylamino; lower dialkylamino; lower alkoxy optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; nitro; cyano; hydroxy; carboxy; lower alkoxy carbonyl; lower haloalkoxy; lower alkoxycarbonyl; lower alkylcarbonyl; aryl; and aralkyl. Specific exemplary substituents include halogen; amino; lower alkylamino; lower dialkylamino; lower alkoxy optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; nitro; cyano; hydroxy; lower haloalkoxy; lower alkoxycarbonyl; lower alkylcarbonyl; lower haloalkyl; phenyl and lower phenylalkyl. Alternatively, specific exemplary substituents include halogen, amino, lower alkoxy, hydroxy, phenyl and benzyl.

In addition, alkyl, cycloalkyl, alkylene, heterocyclyl, and any saturated portion of alkenyl, cycloalkenyl, alkynyl, aralkyl, and heteroaralkyl groups, may also be substituted with =O, =S, =N—R'''. R''' is an optionally substituted alkyl group or aryl group (e.g., optionally substituted phenyl). R''' is preferably an unsubstituted alkyl group or phenyl.

When a heterocyclyl, heteroaryl, or heteroaralkyl group contains a nitrogen atom, it may be substituted or unsubstituted. When a nitrogen atom in the aromatic ring of a heteroaryl group has a substituent the nitrogen may be a quaternary nitrogen.

The polymers disclosed herein can be linear or cross-linked. In some embodiments, the polymers can be cross-linked by incorporation in the polymer of a multifunctional co-monomer, for example, a co-monomer comprising two or more epoxy groups, or a co-monomer comprising two or more ethylene glycol groups. Suitable multifunctionl co-monomers include butanedioldiglycidyl ether, ethanedioldiglycidyl ether, diglycidyl 1,2-cyclohexanedicarboxylate, N,N-diglycidyl-4-glycidyloxyaniline, 1,2,7,8-diepoxyoctane, and 1,2,3,4-diepoxybutane.

The polymers of the invention can be crosslinked by a bridging unit which links at least one repeat unit of a first polymer strand to at least one repeat unit of a second polymer strand. For example, an aryl group represented by G in at least one repeat unit of Structural Formula (I) (or alternatively, aryl groups represented by $B^1$ and U in at least one repeat unit of Structural Formula (II)-(V), respectively), of a first polymer strand of the polymer, and another aryl group represented by G in at least one repeat unit of Structural Formula (I) (or alternatively, aryl groups represented by $B^1$ and U in at least one repeat unit of Structural Formula (II)-(V), respectively), of a second polymer strand of the polymer react with a crosslinking agent to form a bridging unit which connects the two aryl groups. In another example, functional groups, such as hydroxy or amino groups, of two different polymer strands of the polymer react with a crosslinking agent to form a bridging unit. Suitable bridging units include alkylene groups, alkylene bis(cycloalkyl) groups, bis(alkyl)amine groups, diaminoalkylene groups, diacylalkylene groups, diacylarene groups, oxyalkylene groups and alkylene bis(carbamoyl) groups. Specific examples of bridging units include: —(CH$_2$)$_r$—, —CH$_2$—CH(OH)—CH$_2$—, —C(O)CH$_2$CH$_2$C(O)—, —HN—(CH$_2$)$_r$—, —HN—(CH$_2$)$_r$—NH—, —CH$_2$—CH(OH)—O—(CH$_2$)$_s$—O—CH(OH)—CH$_2$—, —(C$_6$H$_{10}$)—(CH$_2$)$_s$—(C$_6$H$_{10}$)—, —C(O)—(C$_6$H$_2$(COOH)$_2$)—C(O)—, —C(O)NH(CH$_2$)$_r$NHC(O)—O—CH$_2$C(O)—O—(CH$_2$CH$_2$—O)$_u$— and —(OCH$_2$CH$_2$)$_r$—, wherein: each r independently is, an integer from 2 to 20 (such as between 2 and 10 or between 2 and 5); each s independently is an integer from 1 to 4; each t independently is an integer from 1 to 100 (such as between 1 and 50 or between 1 and 10); each u independently is an integer from 1 to 100 (such as between 1 and 50 or between 1 and 10).

Typically, the polymers are crosslinked by the crosslinking agent in an amount of between about 0.5% and about 35% by weight or between about 1% and about 25% by weight, based upon the weight of the un-crosslinked polymer.

Any suitable crosslinking agent known in the art can be employed in the invention, such as a crosslinking agent commonly used in the phenolic resin art. Examples of crosslinking agents include hexamethylenetetramine, aminoalkyl silanes, diacrylates, dimethylacrylates, formaldehyde, paraformaldehyde, methylene bisacrylamide, methylene bismethacrylamide, ethylene bisacrylamide, ethylene bismethacrylamide, ethylidene bisacrylamide, divinylbenzene, bisphenol A, dimethacrylate, bisphenol A diacrylate, 1,3-dichloropropane, 1,3-dibromopropane, 1,2-dichloropropane, 1,2-dibromopropane, acryloyl chloride, epichlorohydrin, butanediol diglycidyl ether, ethanediol diglycidyl ether, dimethyl succinate, succinyl dichloride, the diglycidal ether of bisphenol A, pyromellitic dianhydride, toluene diisocyanate, ethylene diamine, dimethyl succinate and melamine. In a specific embodiment, hexamethylenetetramine is employed as a crosslinking agent.

The polymers of the invention can be prepared using techniques known in the art of polymer synthesis. In some embodiments, methods described in U.S. Pat. No. 6,962,963 (the entire teachings of which are incorporated herein by reference) are employed in the syntheses of the un-crosslinked polymers of the invention. The corresponding crosslinked polymers can be prepared using techniques known in the art of polymer synthesis.

In some embodiments, the polymers are prepared by the methods described in the following section.

EXEMPLIFICATION

Example 1

Organo-Siloxane Copolymers

1. Introduction

Biocatalytic synthesis of polymers is of great importance in making functional materials using environmentally benign conditions.[1-3] Enzyme-mediated synthesis has several advantages including environmentally responsible and economical synthesis, yielding processable and stable materials. Applicants have recently shown that biocatalytically synthesized siloxane-based polyesters and polyamides have great potential as flame-retardant (FR) materials.[4] The thermal and flame-retardant properties of these polymers were further improved by crosslinking techniques using hexamethylenetetramine (HMTA) as a crosslinker.[5] In this example, the biocatalytic synthesis of siloxane copolyamides/esters using lipase as a biocatalyst, including a simple synthesis of siloxane-aryl copolyimides using aromatic dianhydrides and aminopropyl terminated polydimethyl siloxane without using any biocatalyst or solvent, are described. The thermal and flame-retardant properties such as degradation temperatures, heat release capacities, and char yields of these polymers are also presented.

EXPERIMENTAL

Materials

Novozyme-435, an immobilized enzyme, was received gratis from Novozymes, Denmark and used as received. All other chemicals and solvents were used without further purification. Aminopropyl terminated polydimethylsiloxane (PDMS) (Mw 900-1100) was purchased from Gelest Inc. and dimethyl 5-hydroxyisophthalate, dimethyl 5-aminoisophthalate, 4,4'-oxydiphthalic anhydride, 4,4'-(4,4'-isopropylidene diphenoxy)bis(phthalic anhydride), 1,4,5,8-naphthalene tetracarboxylic dianhydride, 1,2,4,5-benzenetetracarboxylic dianhydride, and 4,4'-biphthalic anhydride were purchased from Aldrich.

Synthesis

Biocatalytic Synthesis of Siloxane Copolyesters and Copolyamides: Example, 3:

In a simple procedure (Scheme 1), equimolar amounts of previously dried dimethyl 5-hydroxy isophthalate and aminopropyl-terminated polydimethysiloxane (Mw 900-1100) were mixed in a three-neck round-bottom flask. Under nitrogen atmosphere, 10% of the enzyme by weight, Novozyme-435 (immobilized *Candida antarctica* lipase B, protein content 1% with respect to the weight of the monomers) was added. The resulting reaction mixture was stirred at 90° C. under vacuum using a mechanical stirrer for homogeneous polymerization. After 48 hours, the reaction mixture was quite viscous. The reaction was quenched by adding chloroform solvent and then filtered to remove the enzyme. The solvent was removed under reduced pressure to isolate the polymer. The crude polymer was purified by washing with hexane and methanol to remove unreacted monomers and oligomers obtaining 4 in 80% yield (confirmed by NMR spectroscopy).

Scheme 1. Enzymatic synthesis of siloxane copolyesters and copolyamides Biocatalytic synthesis of siloxane copolyimides

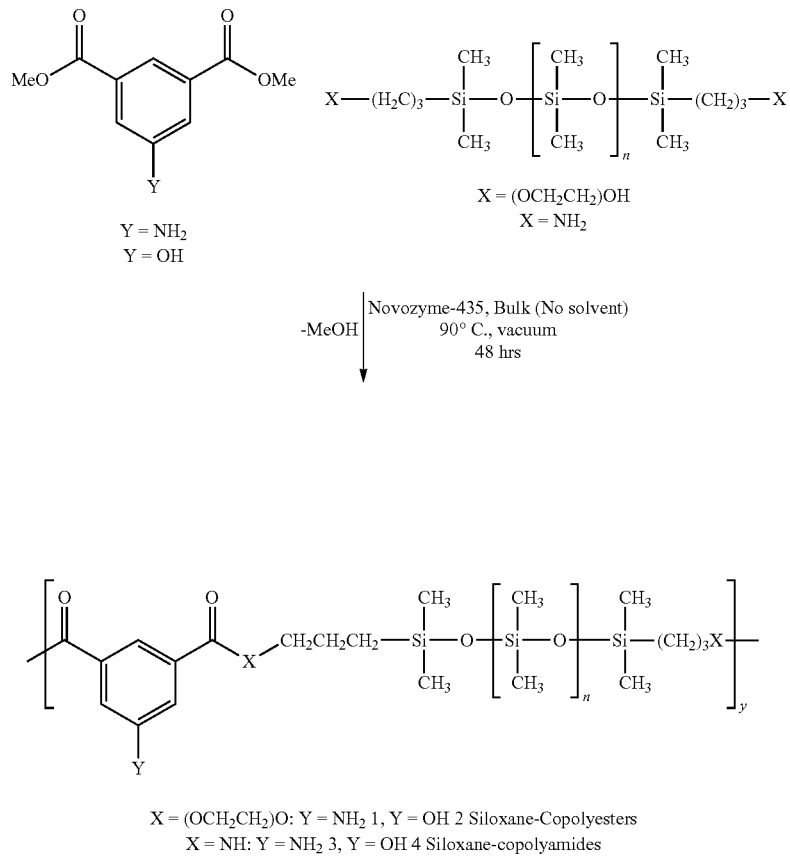

The synthesis of copolyimides was carried out following a procedure which was similar to the one followed in making copolyamides/esters except that dianhydride monomers (Scheme 2) and aminopropyl-terminated polysiloxane were used. The reaction was stopped after 8 hours of heating at 90° C. under vacuum.

Scheme 2. Synthesis of Siloxane copolyimides considered in this study.

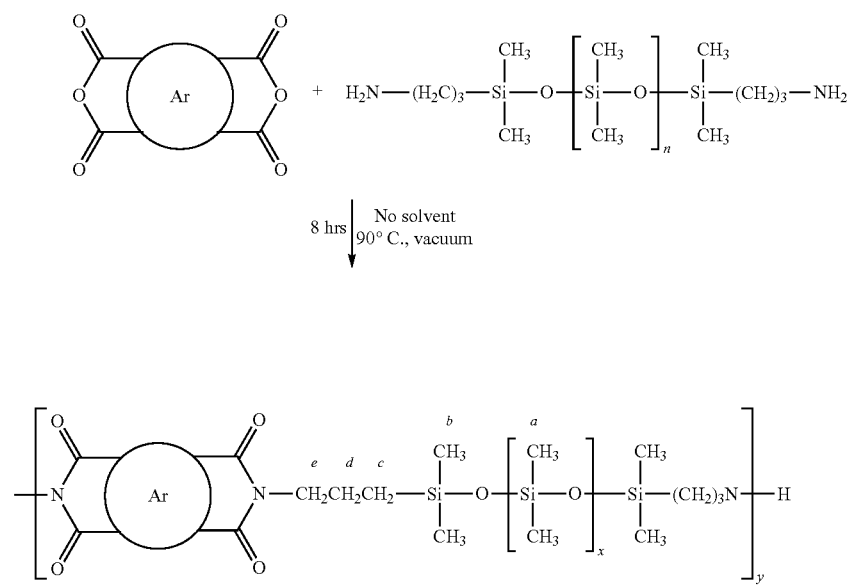

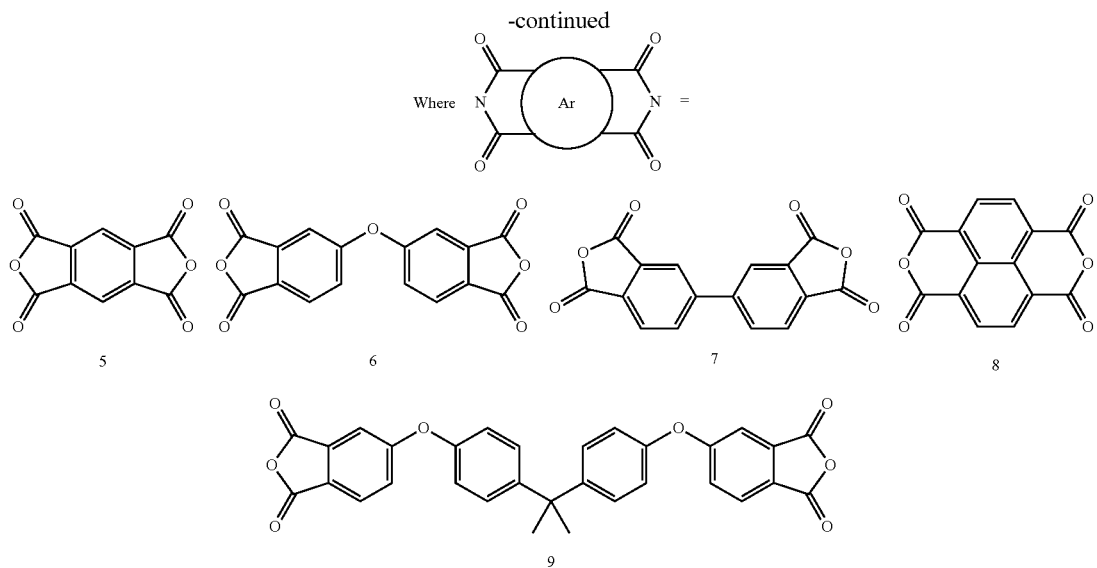

Synthesis of Siloxane Copolyimides without Enzyme

To synthesize these copolyimides, the procedure for enzymatic synthesis was followed except that enzyme was not added. A typical reaction was carried out simply by mixing the amino-terminated PDMS and the corresponding anhydride and heating the reaction mixture at 90° C. under vacuum for 8 hours. The polymers obtained with this simple method without using enzyme were similar to those obtained biocatalytically except there was an intermediate step forming polyamic acids and the end products were mixtures of both imide and amic acid. All the polyimides except 6[6] in FIG. 1 were synthesized without using any biocatalyst. All the polymers synthesized were characterized by $^1$H NMR spectroscopy. 5: $CDCl_3$, δ 9.31 (bs, 2H, Ar=Aromatic), 3.34 (t, 2H, e), 1.62 (m, 2H, d), 0.55 (t, 2H, c), 0.09 (m; a,b); 7: insoluble; 8: $CDCl_3$, δ 8.79 (s, 4H; Ar), 4.21 (t, 2H; e), 1.80 (m, 2H; d), 0.76 (t, 2H; c), 0.11 (m; a,b); 9: $CDCl_3$, δ 7.83 (d, 2H, Ar), 7.36 (bd, 8H; Ar), 7.06 (d, 4H; Ar), 3.67 (t, 2H; e), 1.78 (6H; dimethyl protons in Ar linker), 1.63 (m, 2H; d), 0.64 (t, 2H; c), 0.11 (m; a,b).

Crosslinking with HMTA

Crosslinking of siloxane-copolyamide samples was carried out using hexamethylenetetramine (HMTA). In a typical crosslinking procedure, the copolyamide and HMTA were dissolved in chloroform, and the resultant solution was heated slowly on a hot plate to remove the solvent for 10 minutes and then oven-dried under vacuum at 90-120° C. overnight to remove any residual water.

Characterization $^1$H NMR spectra were recorded on a Bruker Instrument 250 MHz ARX spectrometer equipped with a Silicon Graphics workstation. Thermal decomposition was studied under air using a TA Instruments 2050 thermogravimetric analyzer (TGA). Flammability was measured using a pyrolysis-combustion flow calorimeter (PCFC, FAA microcalorimeter).[7] In this apparatus, a sample of 2-5 mg is pyrolyzed at 1° C./s from approximately 100 to a maximum of 900° C. A metered flow of $N_2$ sweeps the pyrolysis gases into a mixing volume with $O_2$ such that the $N_2/O_2$ mixture would have approximately the composition of atmospheric air. The mixture is oxidized at 900° C. to completion in a flow-tube reactor, $H_2O$ and $CO_2$ products are removed, and the $O_2$ depletion is measured continuously as a function of time. The heat release rate is calculated from the consumption rate of $O_2$. The total heat release and the heat-release capacity reported is the average of three measurements of each sample. The heat release capacity (J/g-K) reported is the ratio of peak heat release rate (W/g) to the heating rate (° C./s).

Results and Discussion

Synthesis

Three types of siloxane-based copolymers, namely, copolyamides, copolyesters and polyimides were synthesized.[4] Copolyamides were synthesized biocatalytically using lipase as a biocatalyst. Copolyimides with various monomers (FIG. 1) and aminopropyl-terminated siloxanes were initially synthesized biocatalytically using lipase as biocatalyst. However, these copolyimides could be synthesized without the biocatalyst as well. Heating the monomer and siloxane at 90° C. under vacuum gave an insoluble to partially soluble product in all cases. However, the flammability properties were invariant to these changes, which make them more interesting relative to copolyamides.

It is very well known in the literature that polyimide preparation traditionally involves initial formation of polyamic acid, followed by ring closure to form the polyimide.[8] The formation of a stable five-member ring is the driving force for forming linear rather than crosslinked polymers. If the intermediate polyamide/polyamic acid is insoluble, the second step must be carried out by solid-state cyclization reaction at high temperatures. It is interesting to note that in our enzymatic synthesis, the cyclization takes place in-situ and gives rise to a clean linear polyimide product without the need of any further processing. This result shows that enzyme is playing a crucial role as a catalyst driving the reaction to imide formation, which otherwise is not possible under those conditions.[6] However, the flammability properties are relatively constant, which indicates that the presence of amic acid structure is not detrimental to the flame-retardant properties of these polyimides. Moreover, it is expected that when the polyamic-acid-containing polyimide is subjected to high temperatures, the imide formation due to the endothermic reaction could indeed slightly reduce the heat release capacity. Thus the synthesis of most polyimides (except 6 in FIG. 1) proceeds without using any biocatalyst, further simplifying the synthetic procedure and reducing the cost of these environmentally safe, flame-retardant polymers.

Crosslinking in Siloxane Copolyamides

The copolyamides synthesized using environmentally benign synthetic routes have been shown to possess a high degree of flame retardancy.[4] However, the products remained as viscous liquids with a heat release capacity around 240 J/g-K. Thus, there is a need to improve the flammability properties. Crosslinking these polysiloxane copolymers with hexamethylenetetramine (HMTA, a common crosslinking agent for phenolic resins[9]) improved both the mechanical properties and flame-retardant properties.[5] FIG. 1 shows the crosslinking product of copolyamide, 3 with 20% HMTA and its NMR characterization, which reveals a few of the many possible crosslinking products.[9]

The flammability results on the copolyamide, 3 (Scheme 1) from the Pyrolysis/Combustion Flow calorimetry (PCFC) technique show that the heat release capacity of these crosslinked polymers drastically decreases with increasing HMTA weight percent (Table 1). In the copolymer crosslinked with 20% of HMTA, the heat release capacity drops to 90 J/g-K, which is very promising and improved over the commercially available flame-retardant polymers such as Kevlar (292 J/g-K)[7] and PEEK (180 J/g-K)[7]. However, the char yield and total heat release remained similar in all HMTA compositions.

TABLE 1

Heat release capacity of siloxane copolyamide (3, Scheme 1) as a function of HMTA weight percent

| % HMTA (by weight) | HR capacity ($Jg^{-1}K^{-1}$) | Total HR ($KJg^{-1}$) | Char yield (%) |
|---|---|---|---|
| 0 | 194 | 15.8 | 11 |
| 1 | 173 | 13.1 | 12.3 |
| 5 | 156 | 12.6 | 14.4 |
| 10 | 108 | 11.4 | 14.9 |
| 15 | 125 | 13.6 | 12.5 |
| 20 | 90 | 12.8 | 13.2 |

$^1$H NMR spectral studies on all the copolyimides synthesized non-enzymatically revealed that they form polyimides with contamination of polyamic acid product.[6] The degradation temperatures at 20% weight loss from TGA and heat release capacity, total heat release and char yields from PCFC measurements of siloxane copolyimides, 5-9 are provided in Table 2.

TABLE 2

Degradation temperatures at 20% weight loss ($T_{deg}$) from TGA measurements in air atmosphere and heat release capacity, total heat release and char yields from PCFC measurements of siloxane copolymers 5-9. 6a, 6b are enzymatic and non-enzymatic products, respectively.

| Polymer | $T_{deg}$/Air (20% weight loss) | HR capacity ($Jg^{-1}K^{-1}$) | Total HR ($kJg^{-1}$) | Char yield (%) |
|---|---|---|---|---|
| 5 | 450 | 310.3 | 13.3 | 4.0 |
| 6a | 472 | 450.8 | 24.4 | 6.7 |
| 6b | 480 | 418.4 | 22.4 | 7.9 |
| 7 | 414 | 363.4 | 11.4 | — |
| 8 | 432 | 324.1 | 13.6 | 12.4 |
| 9 | 430 | 425.5 | 21.4 | 10.9 |

Figure 2:
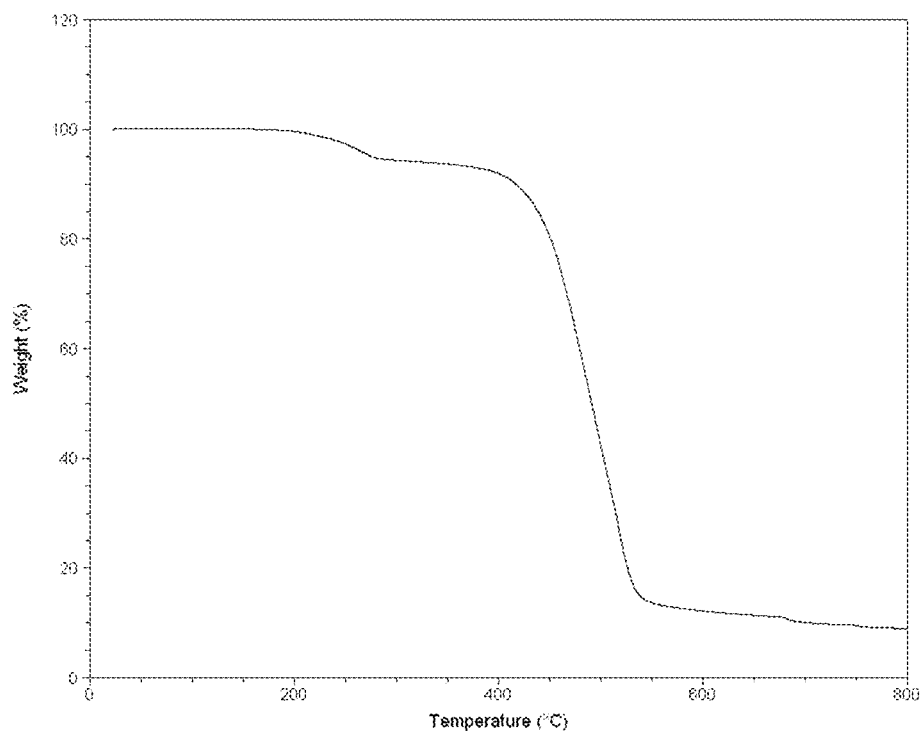
FIG. 2—Thermogravimetric analysis (TGA) curve of siloxane copolyimide (5).

As can be seen from the table, the degradation temperatures of copolyimides are found to be higher, ranging from 450-480° C. compared to polyamides (~400° C.)[4]. The copolyimides show the heat release capacities in the order of 5<8<7<6b<9<6a. It is interesting to note that 5 has the lowest heat release capacity despite its lowest aromatic content among all the linkers, which suggests that, in these polymers, the degradation mechanism and siloxane content play crucial roles rather than the aromatic content. 8 was found to have the highest char yield, which could be attributed to its likely formation of graphite like char during degradation due to its fused aromatic structural feature. It is clearly seen that extended aromatic linker, 9 did not improve the heat release capacity. Total heat release is lower in case of 5, 7 and 8 compared other polyimides which is consistent with their heat release capacities. FIG. 2 shows the TGA curve of the copolyimide, 5. It is apparent from the curve that the weight loss transition at approximately 200° C. could be due to the conversion of polyamic acid into the polyimide structure.

Previously reported GCMS analysis[4] of pyrolyzed samples of siloxane copolyamides (eg. 3) revealed the formation of cyclic siloxane compounds, such as $[SiO(CH_3)_2]_m$ (where m=5-12). These results suggested that in our siloxane copolymers, dimethyl siloxane groups react with each other to form non-toxic cyclic compounds, which is an added advantage.

Conclusions

Polysiloxane copolymers are found to be an interesting class of environmentally safe, non-halogenated, flame-retardant materials with high thermal stability and promising flame-retardant properties. The crosslinking of one of the copolyamides, 3, improved the flammability properties tremendously by lowering the heat release capacity. The simple and economical synthesis without the use of enzymes makes polyimides economically more attractive FR materials over other copolymers. The study revealed that the aromatic content in the linker has a minimal role in improving the heat release capacities in polyimides. The fused aromatic structures in linkers may be advantageous in lowering the heat release capacity in these polymers. The real advantage of any of the copolyamides/esters and some of the copolyimides compared to other FR polymers is that these materials can be solution-processed onto any substrate, which could make them not only environmentally safe but potentially cost-effective as well.

REFERENCES

1. Schmid, A.; Dordick, J. S.; Hauer, B.; Kieners, A.; Wubbolts, M.; Witholt, B. *Nature,* 2001, 409, 258.
2. Kobayashi, S.; Uyama, H.; Kimura, S. Chem. Rev. 2001, 101, 3793. (b) Gross, R. A.; Kumar, A.; Karla, B. *Chem. Rev.* 2001, 101, 2097.
3. Watterson, Arthur C.; Parmar, Virinder S.; Kumar, Rajesh; Sharma, Sunil K.; Shakil, Najam A.; Tyagi, Rahul; Sharma, Ajendra K.; Samuelson, Lynne A.; Kumar, Jayant; Nicolosi, Robert; Shea, Thomas. *Pure and Appl. Chem.* 2005, 77, 201.
4. Kumar, R.; Tyagi, R.; Parmar, V. S.; Samuelson, L. A.; Kumar, J.; Schoemann, A.; Westmoreland, P. R.; Watterson, A. C. *Adv. Mater.* 2004, 16, 1515.
5. Mosurkal, R.; Tucci, V.; Samuelson, L. A.; Bruno, F.; Westmoreland, P. R.; Kumar, J.; Watterson, A. C. *Poly. Preprints* (American Chemical Society, Division of Polymer Chemistry) 2006, 47, 1110.
6. Mosurkal, R.; Samuelson, L. A.; Parmar, V. S.; Kumar, J.; Watterson, A. C. *Macromolecules* (submitted).
7. Richard E. L. and Richard N. W. *J. Anal Appl Pyr.* 2004, 71, 27.
8. (a) Stevens, M. P. *Polymer Chemistry: An Introduction,* 3rd ed., Oxford University Press: Oxford, 1999, p. 447. (b) Ogura, T. and Ueda, M. *Macromolecules,* 2007, 40, 3527.

9. Zhang, X.; Looney, M. G.; Solomon, D. H.; Wittaker, A. K. *Polymer*, 1997, 38, 5835.

Example 2

Biocatalytic Synthesis of Organo-Siloxane Copolyimide

Introduction.

Biocatalytic synthesis of polymers[1,2] is of great importance in making functional materials under environmentally benign conditions. Enzyme mediated synthesis has several advantages which include, environmental compatibility, economical synthesis, ease of processability and stability. Synthesis of polymers using lipase catalyzed (*Candida antarctica*) polymerization reactions has led to a variety of new materials with interesting properties.[3] Applicants have recently shown that lipase catalyzed synthesis of siloxane based organic-inorganic hybrid polyesters and polyamides have great potential as flame retardant (FR) materials.[4] The thermal and flame retardant properties of these polymers were further improved by crosslinking techniques using hexamethylenetetramine as a crosslinker.[5] However, the decomposition temperatures (390-400° C. in air atmosphere) of these polymers are lower compared to well known FR polymers which have a decomposition temperature in the range of 500-550° C.[6] and thus there is a need to improve the thermal stability. Polyimides in general have high thermal stability and as a result have found numerous applications as engineering plastics, high strength composites, thermally stable films, molding compounds and adhesives. Polyimides are also known for their good oxidative and hydrolytic stability in addition to thermal stability. It is very well known in the literature that conventional polyimide preparation involves initial formation of a polyamide/polyamic acid, followed by ring closure to form a polyimide.[7] Formation of a stable five-membered ring is the driving force for forming linear rather than crosslinked polymer. In most cases, the intermediate polyamide/polyamic acid, is insoluble and the second step must be carried out by solid state cyclization reaction at high temperature. Previously reported copolyimides with siloxane moieties showed excellent adhesive and thermal properties compared to other aromatic polyimides.[8] Biocatalytic synthesis of polyimides is a promising new alternative to traditional chemical routes in that it offers a more facile and environmentally friendly approach. In this communication, we present the biocatalytic synthesis of a siloxane copolyimide using aminopropyl terminated polydimethylsiloxane and 4,4'-oxydiphthalic anhydride in the presence of lipase as a biocatalyst without using any solvent. To confirm the role of the lipase as a catalyst to driving the reaction to imide formation, the biocatalytically synthesized polyimide was compared with the same polyimide synthesized without the biocatalyst. The synthesis and resulting polymer properties are described in this example.

Experimental Section. a. Materials.

Novozyme-435, an immobilized enzyme from Novozymes, Denmark was used as the biocatalyst. All other chemicals and solvents (Aldrich) were used without further purification. Aminopropyl terminated polydimethylsiloxane ($M_w$ 900-1000) was purchased from Gelest Inc. 4,4'-Oxydiphthalic anhydride was purchased from Aldrich. The $^1$H NMR, and $^{13}$C NMR spectra were recorded on a Bruker 250 MHz ARX spectrometer equipped with a Silicone Graphics workstation. Gel permeation chromatography (GPC) was used to determine the molecular weights and molecular weight distributions, $M_w/M_n$ of polymer samples.

b. Polymer Preparation.

In a simple procedure (Scheme 1), equimolar amounts of previously dried 4,4'-oxydiphthalic dianhydride (OxyDAH) and aminopropyl terminated polydimethysiloxane ($M_w$ 900-1000) were placed in a three-neck round bottom flask. After stirring the monomers for 10 minutes under nitrogen atmosphere, 10% by weight of the enzyme, Novozyme-435 (immobilized *Candida antarctica* lipase B, protein content 1%) with respect to the weight of the monomers was added. The resulting reaction mixture was stirred at 90° C. under vacuum. After 8 hrs, the reaction mixture was completely viscous and stopped stirring. The reaction was cooled to room temperature and quenched by adding chloroform, and then filtered to remove the enzyme. The solvent was then removed under reduced pressure and the polymer residue was washed with hexane to remove any unreacted monomers and dried under vacuum to obtain siloximide in 80% yield which was confirmed by various spectroscopic techniques.

$^1$H NMR (CDCl$_3$): δ=0.10 (bs, methyl protons of dimethyl siloxane main chain, C-l), 0.64 (t, 2H, C-i), 1.73 (m, 2H, C-h), 3.70 (t, 2H, C-g), 7.40 (dd, 2H, C-e, C-f), 7.47 (d, 2H, C-c and C-d), 7.90 (d, 2H, C-a and C-b). $^{13}$C NMR (CDCl$_3$): δ=0.76, 15.11, 22.32, 40.87, 113.32, 123.80, 125.21, 127.46, 134.78, 160.62, 167.0. $M_n$ (GPC): 75 kDa, PD 1.4.

Scheme 1. Enzymatic synthesis of siloxane copolyimide, siloximide-E.

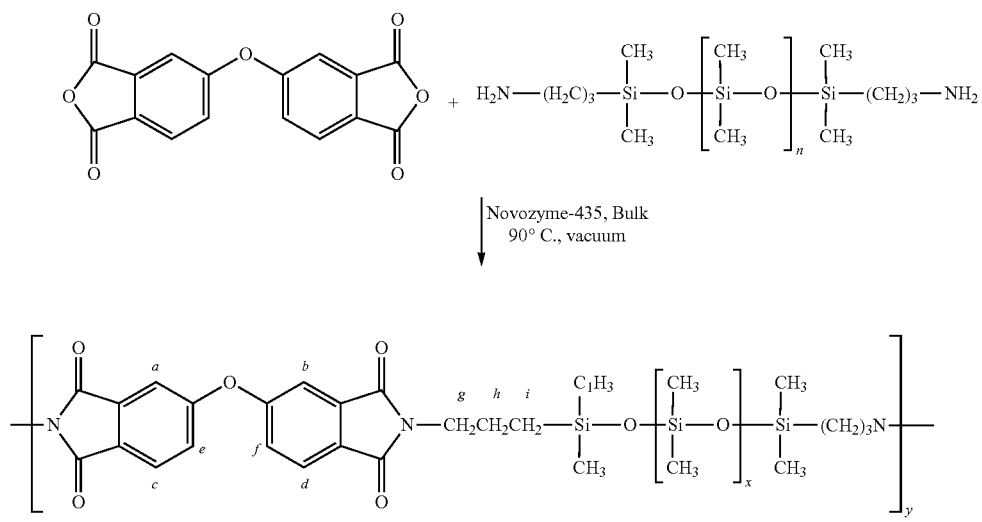

In the non-enzymatic reaction, the above procedure for enzymatic synthesis was followed except that enzyme was not added. A typical reaction was carried out simply by mixing the amino terminated PDMS and the corresponding anhydride and heating the reaction mixture at 90° C. under vacuum for 8 hrs. The polymer, siloximide-NE obtained with this simple method without using enzyme was similar to the product obtained enzymatically except that it seem to undergo an intermediate step forming polyamic acid. The reaction was monitored by $^1$H NMR spectroscopy. The details are discussed in the results and discussion section.

$^1$H NMR of siloximide-NE (CDCl$_3$): δ=0.10 (bs, methyl protons of dimethyl siloxane main chain, C-1), 0.64 (t, 2H, C-i), 1.73 (m, 2H, C-h), 3.70 (t, 2H, C-g), 7.40 (dd, 2H, C-g), 7.47 (d, 2H, C-e), 7.90 (d, 2H, C-h). Extra peaks: 7.61-7.64 (m), 8.12-8.17 (d)

Results and Discussion.

Figure 3:
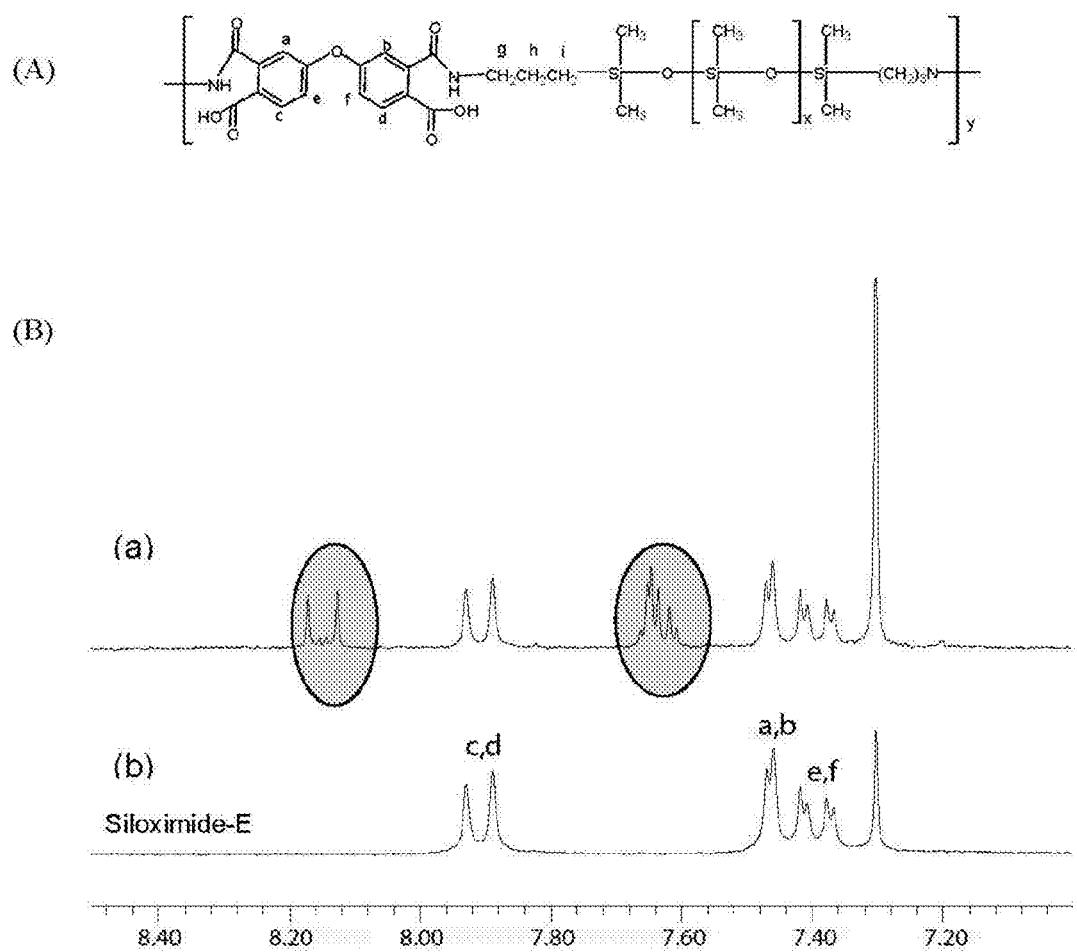
FIG. 3—(A) Structure of siloximide-NE in polyamic acid form (B) Aromatic region of $^1$H NMR spectra in $CDCl_3$ (a) siloximide-NE (b) siloximide-E.

To this date, we have biocatalytically synthesized three types of siloxane based copolymers, namely, polyesters, polyamides and polyimides. The synthesis of the copolyamides and polyesters was reported earlier.[3,4] This is the first report of the biocatalytic synthesis of a polyimide. Here copolyimide with OxyDAH monomer and aminopropyl terminated siloxane was synthesized biocatalytically using Novozyme-435 as the biocatalyst. It is interesting to note that in our enzymatic synthetic approach, the cyclization takes place in-situ and gives rise to a clean linear polyimide product without any further heating, which has been confirmed by NMR spectroscopy. The polyimide preparation using aminopropyl terminated polydimethylsiloxane and 4,4'-oxydiphthalic anhydride (Scheme 1) without enzyme gave a partially soluble polymer, siloximide-NE. That implies formation of polyamic acid instead of imide directly. However, the enzymatic synthesis gave a soluble polyimide (siloximide-E) and no further purification was necessary. The $^1$H NMR spectral comparison of the polyimides prepared using enzyme and without enzyme are shown in FIG. 3.

Figure 4:
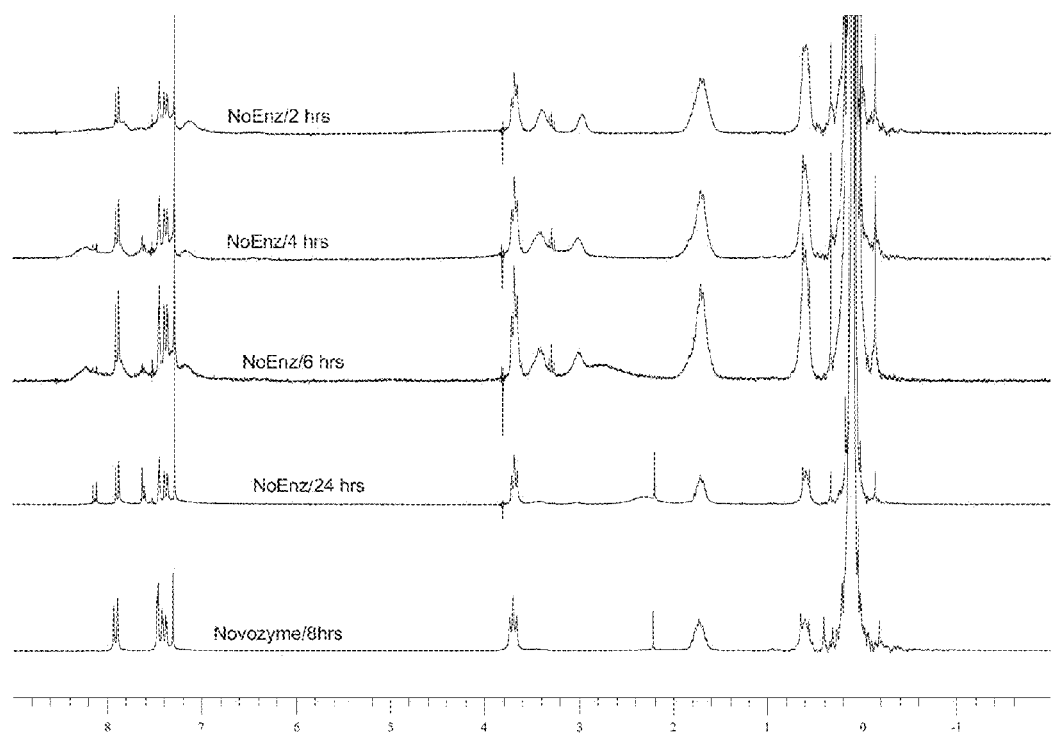
FIG. 4—Monitoring the synthesis of siloximide-NE by $^1$H NMR spectroscopy in $CDCl_3$.

The extra peaks at 7.61 and 8.12 ppm in aromatic region (highlighted in FIG. 3(B)(A)) confirm the contamination of the product with polyamide/polyamic acid. This demonstrates that lipase (Novozyme-435) is playing a crucial role as a catalyst driving the reaction to imide formation which otherwise is not possible under non-enzymatic conditions. Monitoring of the non-enzymatic reaction (FIG. 4) revealed that, even after 24 hours of reaction the product was a mixture of polyimide and amic acid, whereas the enzymatic reaction resulted in a clean polyimide product in 8 hours. GPC confirmed an unusually high molecular weight (75 kDa) in these enzymatically prepared polysiloxane polymers. The high molecular weight compared to our earlier siloxane-copolyesters or polyamides (20 kDa)[4] could be due to the favorable imide ring formation in the presence of enzyme. The enzyme seems to be optimizing the two step reaction in the case of these polyimides, where it is first catalyzing the trans(amidation) reaction and secondly carrying out the imidation with the adjacent COOH groups. The thermo-gravimetric analysis (TGA) measurements on the siloximide-E (FIG. 5) showed a significantly improved the degradation temperature up to 472° C. at 10% weight loss in air atmosphere, which was the original goal of this work. Differential scanning calorimetric (DSC) studies revealed that siloximide-E retains its glass transition temperature below −60° C.

Conclusion. A high molecular weight and processable siloxane copolyimide, siloximide-E with improved thermal degradation behavior has been synthesized biocatalytically for the first time using lipase as a biocatalyst. Comparison to the non-enzymatically synthesized polyimide, siloximide-NE confirmed the role of the lipase as a catalyst to optimizing the reaction for polyimide formation. This simple, environmentally benign biocatalytic synthesis of polyimide without the need for any intermediate step of polyamic acid could open up a new class of "green" enzymatic synthetic routes for polyimides with improved properties.

REFERENCES AND NOTES (1) Schmid, A.; Dordick, J. S.; Hauer, B.; Kieners, A.; Wubbolts, M.; Witholt, B. *Nature,* 2001, 409, 258.
(2) (a) Kobayashi, S.; Uyama, H.; Kimura, S. *Chem. Rev.* 2001, 101, 3793. (b) Gross, R. A.; Kumar, A.; Karla, B. *Chem. Rev.* 2001, 101, 2097.
(3) Watterson, Arthur C.; Parmar, Virinder S.; Kumar, Rajesh; Sharma, Sunil K.; Shakil, Najam A.; Tyagi, Rahul; Sharma, Ajendra K.; Samuelson, Lynne A.; Kumar, Jayant; Nicolosi, Robert; Shea, Thomas. *Pure and Appl. Chem.* 2005, 77, 201.
(4) Kumar, R.; Tyagi, R.; Parmar, V. S.; Samuelson, L. A.; Kumar, J.; Schoemann, A.; Westmoreland, P. R.; Watterson, A. C. *Adv. Mater.* 2004, 16, 1515.
(5) Mosurkal, R.; Tucci, V.; Samuelson, L. A.; Bruno, F.; Westmoreland, P. R.; Kumar, J.; Watterson, A. C. *Poly. Preprints* (American Chemical Society, Division of Polymer Chemistry) 2006, 47, 1110.
(6) Wang, H-H and Su C-C, *J. Appl. Polym. Sci.* 1996, 61, 1087.
(7) (a) Stevens, M. P. *Polymer Chemistry: An Introduction,* 3rd ed., Oxford University Press: Oxford, 1999, p. 447. (b) Ogura, T. and Ueda, M. *Macromolecules,* 2007, 40, 3527.
(8) Lee, Y-D.; Lu, C-C.; Lee, H-R. *J. Appl. Polym. Sci.* 2003, 41, 877.

Example 3

Syntheses of Siloxane Monomers

Polydiphenylsiloxane, Gelest PDS-9931 was synthesized in a similar manner as poly-dimethyl-co-diphenyl siloxane, from section 4.2. The structure of the material precludes direct attachment of an ethanol type moiety.

Figure 5:
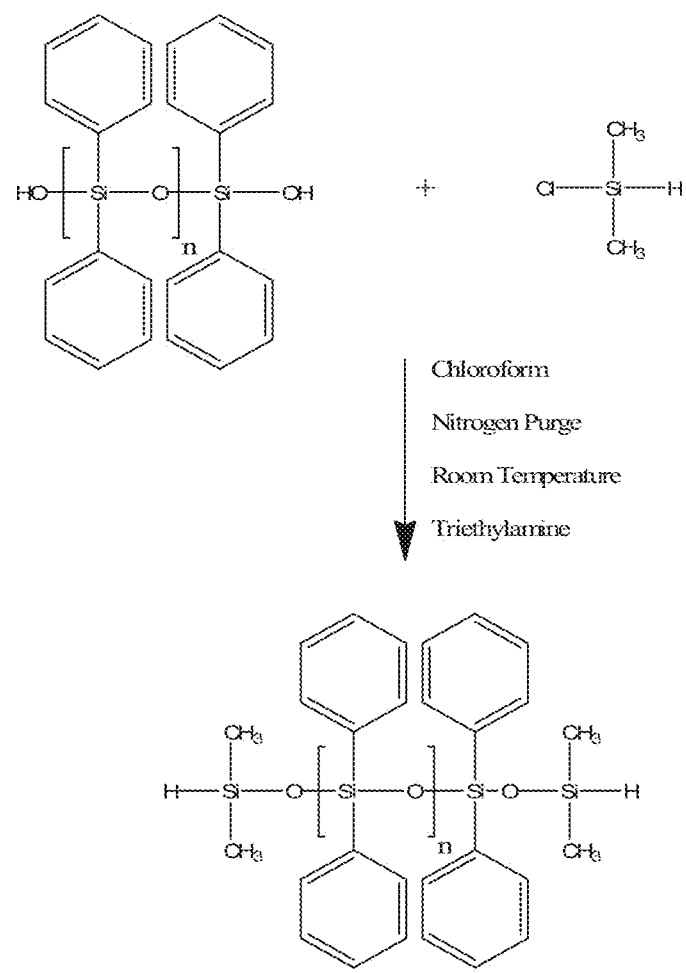
FIG. 5—Silation of PDS-9931
Figure 6:
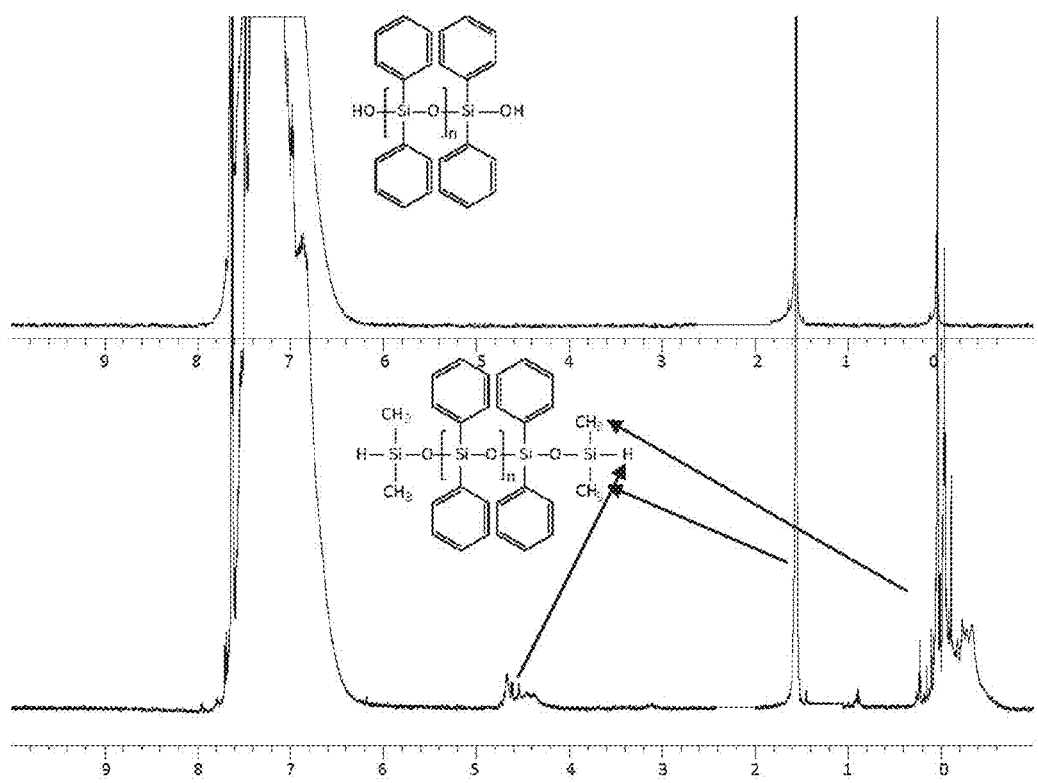
FIG. 6—NMR Silation of PDS-9931

The creation of the primary alcohol was done via the intermediary step of attachment of chloro dimethylsilane in a condensation type reaction. This reaction easily allows the creation of a hydride functionality which can be changed to the primary alcohol, which is needed for enzymatic condensation synthesis (FIG. 5). The NMR is shown in FIG. 6.

Clearly the silane-H peak can be seen around 4.5-4.8. The diverse peaks are probably due to the shielding from the high concentration of phenyl groups, Diemthyl peaks of the silane can also be clearly seen.

The same reaction that was done on poly-dimethyl-co-diphenyl siloxane, to obtain a primary alcohol functionality is now done on polydiphenylsiloxane.

Figure 7:
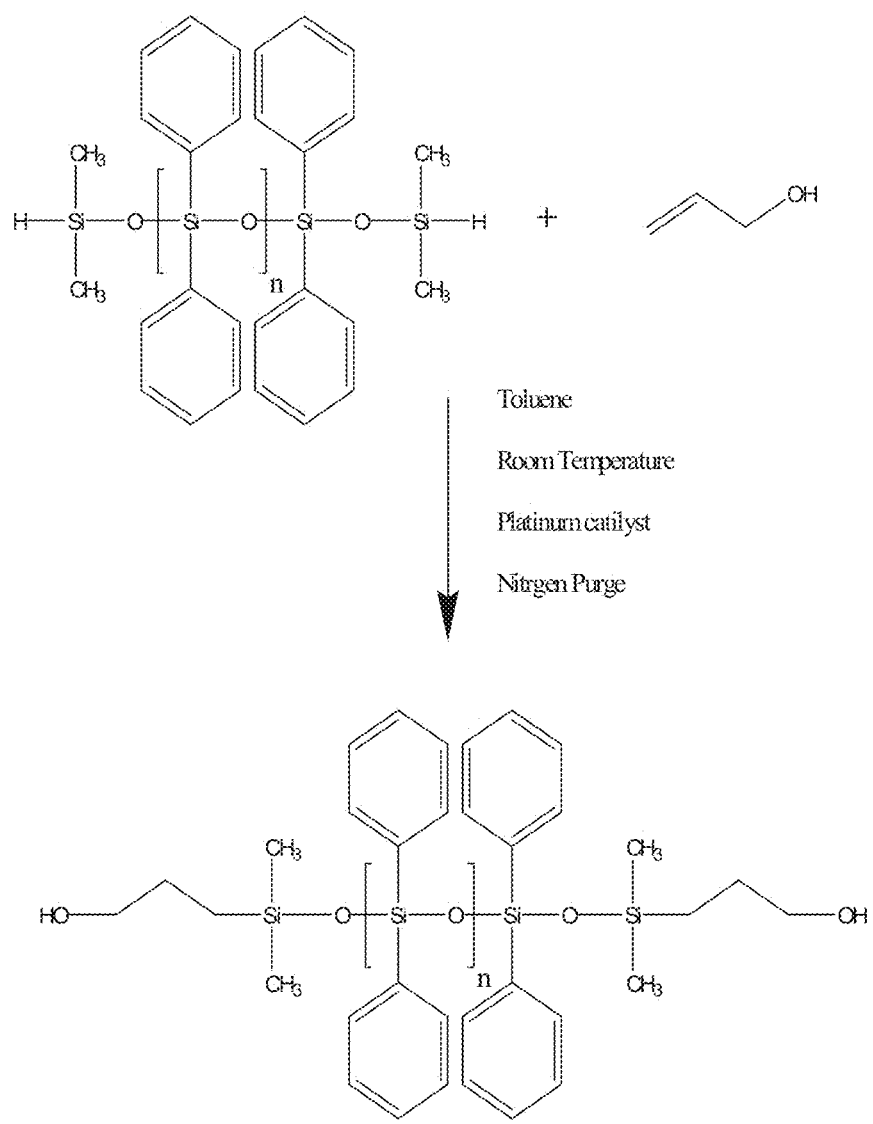
FIG. 7—allyl alcohol attachment of PDS-9931

The creation of the primary alcohol functionality we seek is easily done with platinum catalyst and a vinyl group. In our case allyl alcohol is used and is easily attached (FIG. 7).

Figure 8:
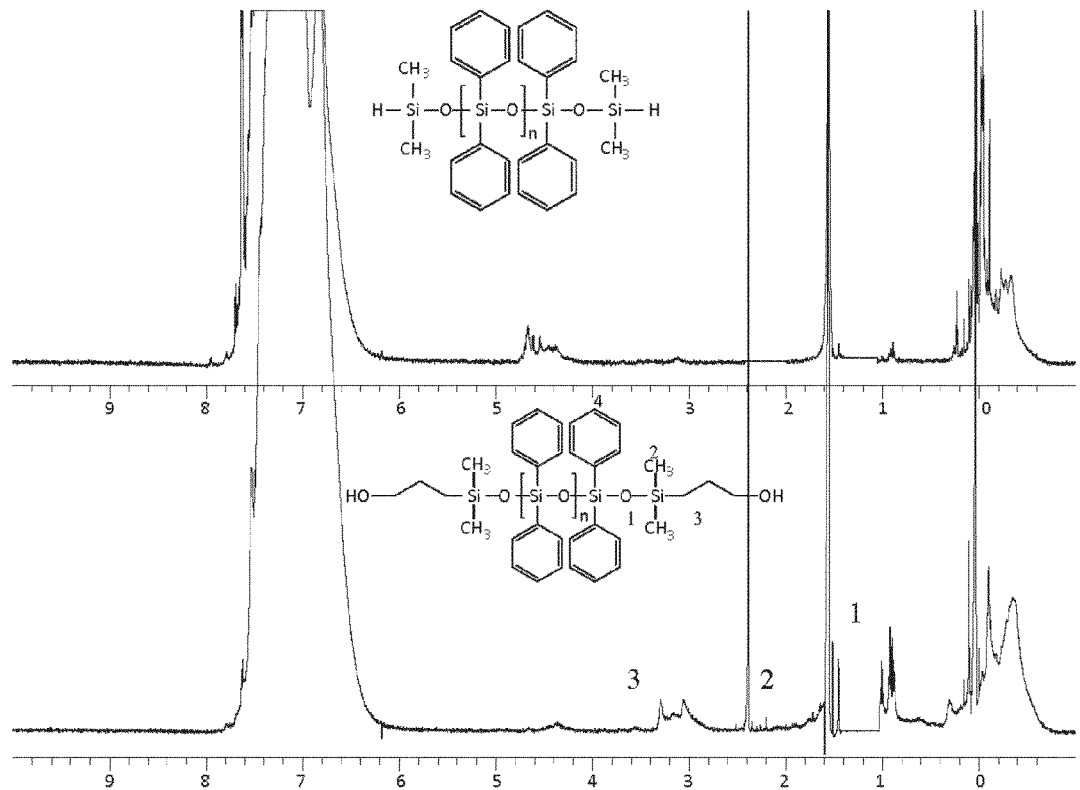
FIG. 8—NMR allyl alcohol attachment of PDS-9931

The 2 methylene peaks next to the silicon on the end of the chain, can clearly be seen at 3-3.5 ppm, 1 ppm. The —CH$_2$— closet the silicon, is hidden by the methyl peaks of the silane (FIG. 8).

Figure 9:
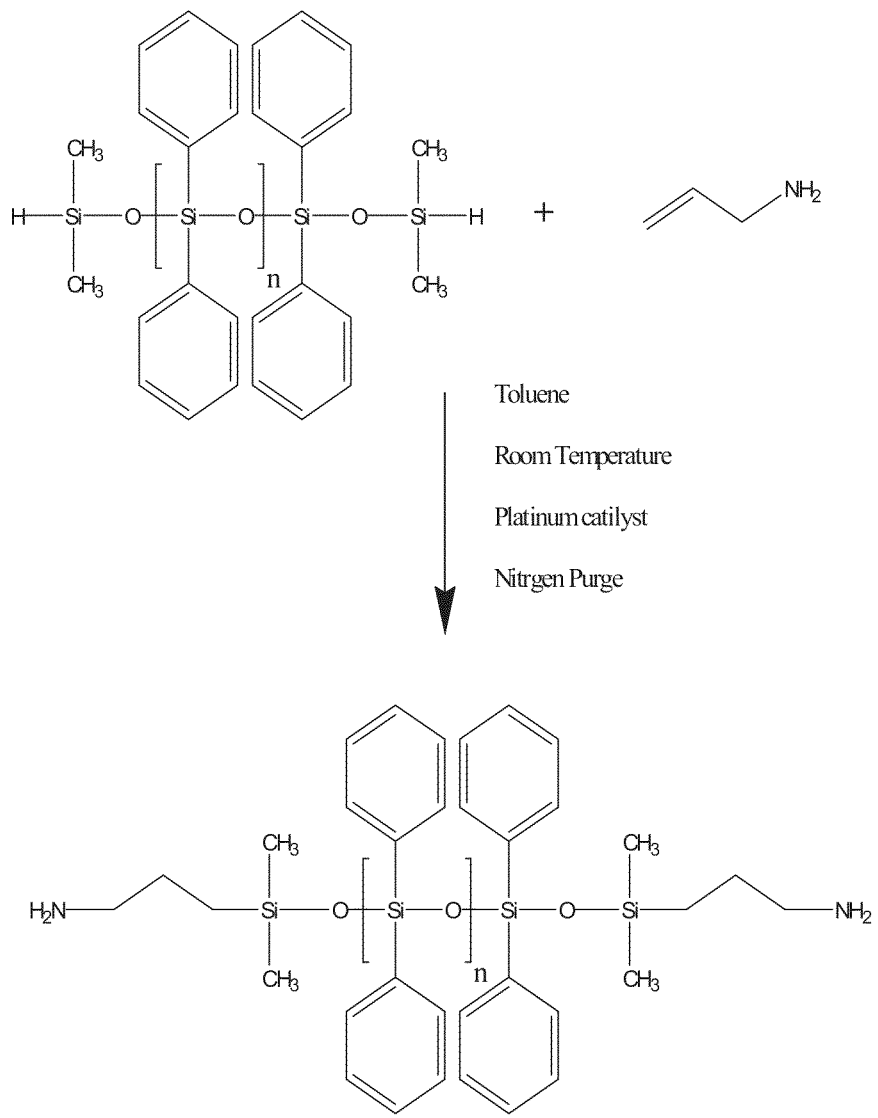
FIG. 9—allyl amine attachment of PDS-9931
Figure 10:
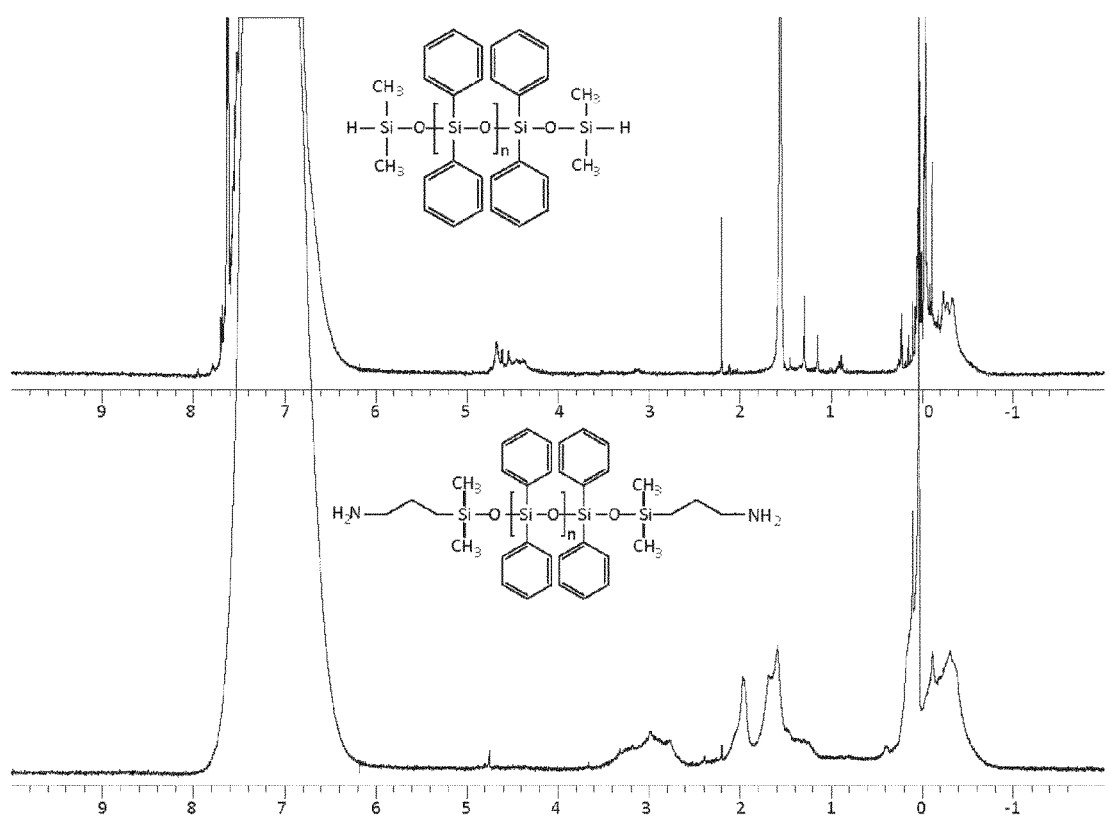
FIG. 10—allyl amine attachment of PDS-9931

Similarly Amine functionalized diphenyl siloxane was created (FIGS. 9 and 10).

The linking of this short chain polymer, with dimethyl 5-hydroxyisophthalate, can only be done in a solvent, previous work has shown that novozyme 435 only works well in a non-polar solvent.[1] Since we are using high vacuum and 90° C. to remove the condensate of methanol in the reaction, a solvent must be used that has a very high boiling point. Toluene was initially used, but proved to easily evaporated under the above conditions. Toluene was also tried, with only a nitrogen bubble purge, at 90° C., but the reaction would not proceed. A test reaction of polydimethyl siloxane was done, in addition, proving that high vacuum was needed to remove the methanol bi-product. Diphenyl ether has been used previously to success with novozyme, by 259° C. Anhydrous diphenyl ether was not available, therefore the diphenyl ether was dried, over potassium carbonate at 110° C., for a period of 12+ hours. Isophthalate was only partially soluble in diphenyl ether, but did eventually dissolve. Polysiloxane was freely soluble in diphenyl ether. The other conditions of the reaction was the same as previous polysiloxane linking reactions with the exception of the reaction time was 4 days, instead of only 2, due to the dilution of the solvent, the reaction rate was lower. Polydiphenylsiloxane was dried by heating in a vacuum oven at 75° C. for 24 hours. Dimethyl 5-hydroxyisophthtalate was dried in oven at 105° C., for a period of several days.

Figure 11:
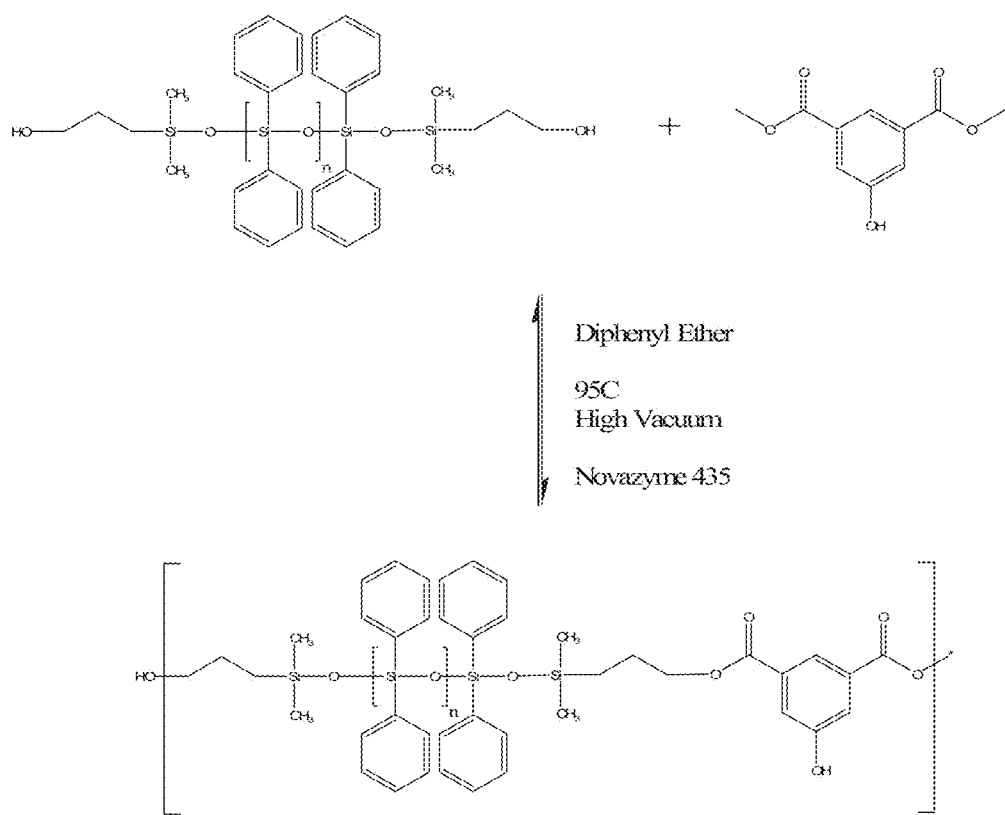
FIG. 11—synthesis of PDS-9931 ester-co-5-hydroxy isophthalate

Polydiphenyl siloxane, and dimethyl 5-hydroxyisophthalate, was dissolved in diphenyl ether, in a 1:1 molar ratio. The reaction mixture was heated to 100° C., and allowed to stir overnight, under intermittent vacuum. This was both to remove any residual moisture as well as create a homogeneous mixture. The mixture was then allowed to cool, and dry novozyme 435 was added, at a 10% by weight load. The mixture was left for 4 days under high vacuum at 95° C. At 2 days, dry novozyme 435 was re-introduced, at a 10% by weight load. This was done in case the original load of novozyme 435 had lost its activation. The reaction scheme is shown in FIG. 11 with the NMR results in FIG. 12.

Figure 12:
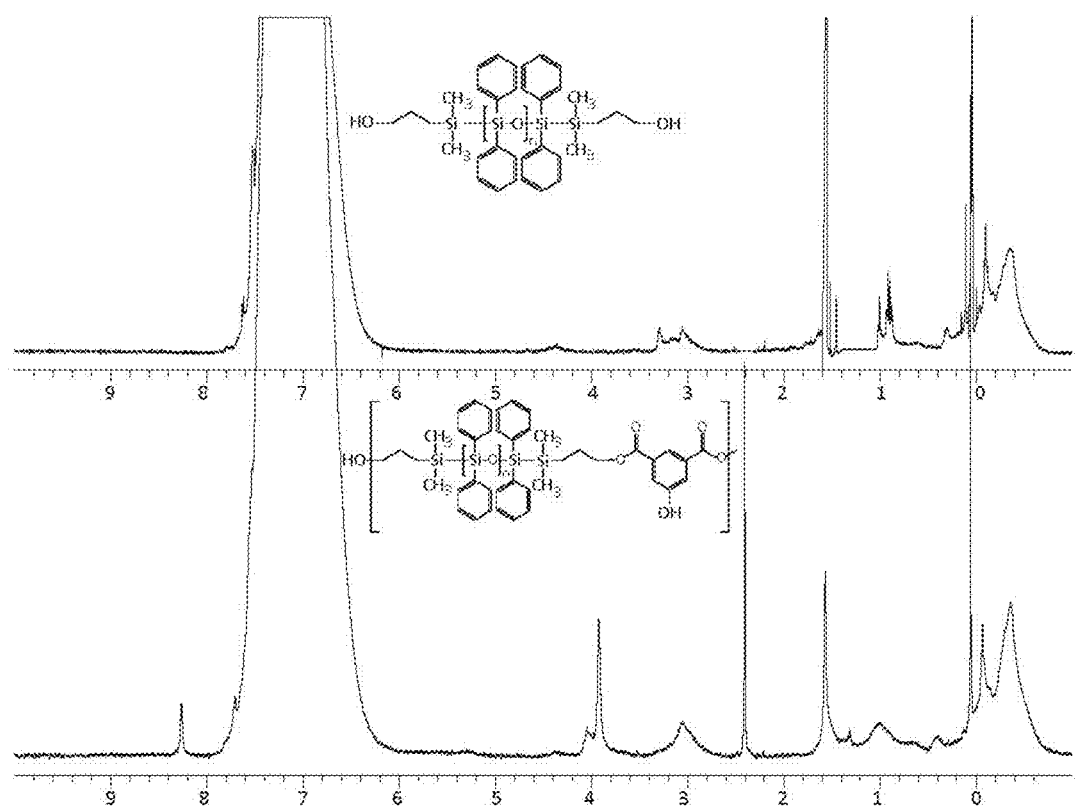
FIG. 12—NMR synthesis of PDS-9931 ester-co-5-hydroxy isophthalate

The NMR of FIG. 12 clearly shows the wide peaks of the isophthalate, indicating attachment to the polydiphenyl siloxane. However, the sharp peak, close to 4 ppm, indicates there might be still some unreacted dimethyl 5-hydroxyisophthalate.

Figure 13:
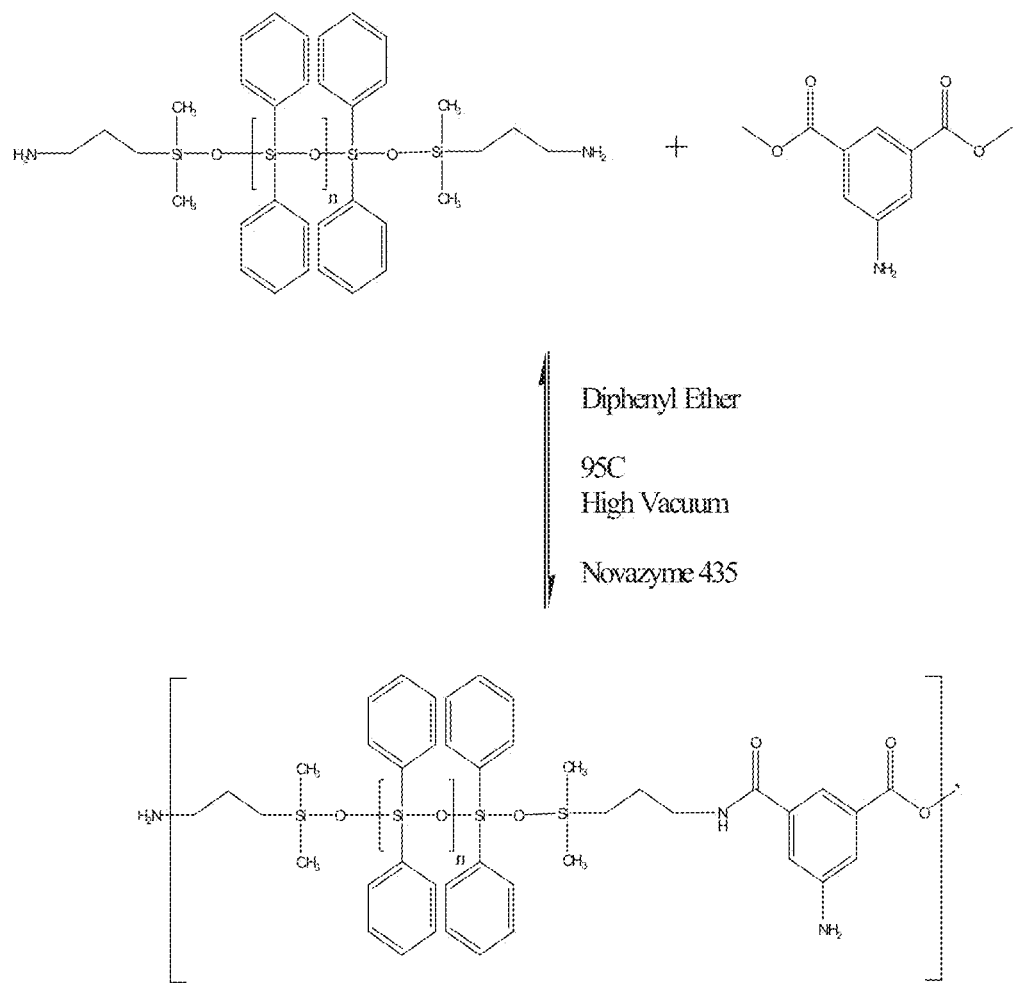
FIG. 13—synthesis of PDS-9931 amine-co-5-amino isophthalate

In a similar manner PDS-9931 amine-co-isophthalate was made (FIG. 13). However in that case the reaction was only left for 30 hours. This was due to a solubility problem that appeared half way through the reaction. This was due to the evaporation of the diphenyl ether that cause the reacting polymer to lose some of its solubility in that solvent. These results can be seen in the lowered molecular weight in the GPC traces in FIGS. 14 and 15.

In both cases the purification was the same, the reaction mixture, was allowed to cool and filtered to remove the novozyme 435. The polydiphenyl siloxane was then precipitates out with a ~7 times excess of methanol, isophthalate is partially soluble in methanol and should be removed. The polymer was then dried, in a vacuum oven at 75° C. The small of diphenyl ether was still present, therefore the polymer was re-dissolved in toluene and precipitated out again with a ~7 times excess of methanol.

Figure 14:
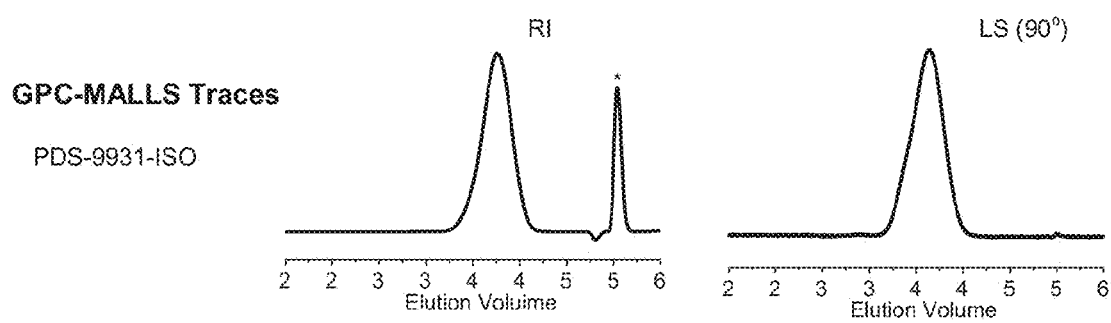
FIG. 14—GPC-MALLS traces of Polidiphenyl siloxane ester-co-5-hydroxyisophthalate FIG. 15—GPC-MALLS traces Polidiphenyl siloxane amino-co-5-amineisophthalate FIG. 16—TGA Polidiphenyl siloxane ester-co-5-hydroxyisophthalate FIG. 17—TGA Polidiphenyl siloxane amino-co-5-amineisophthalate
Figure 15:
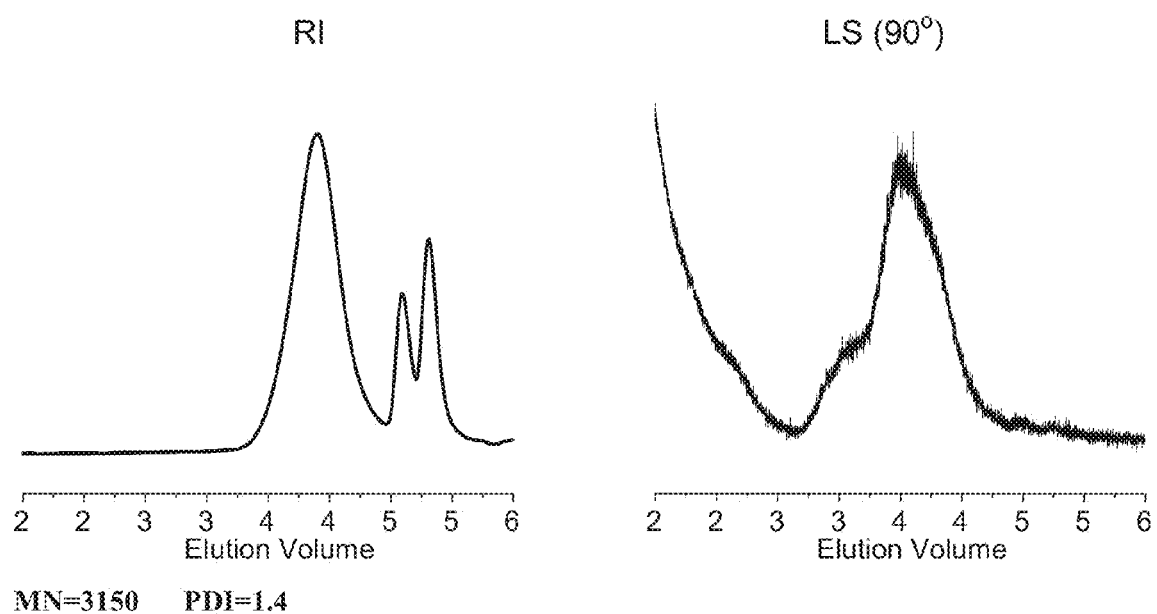

GPC:

Gel permeation chromatography was done on a Waters HPLC system equipped with a 510 HPLC pump, model 410 differential refractometer, model 441 absorbance detector (254 nm), online multiangle laser light scattering (MALLS) detector (MiniDawn, Wyatt Technology Inc.). Model 712 sample processor, and five Ultrastyragel GPC columns connected in the following series, 500, $10^3$, $10^4$, $10^5$, and 100 Å. THF was used as the carrier fluid and the flow rate was set at 1.0 ml/min at room temperature (FIGS. 14 and 15).

Thermal Testing

Figure 16:
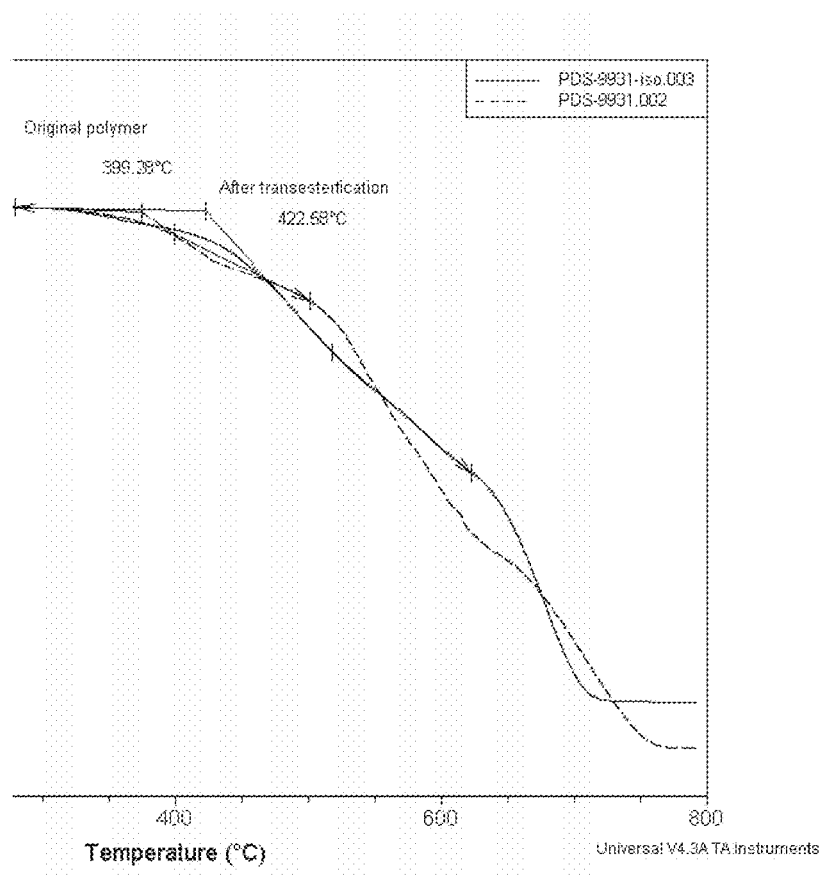

TGA and PCFC, were both done on the polydiphenylisophthalate copolymer. TGA, was done on a Q50 thermogravameteric analyzer using a ceramic oven and ceramic pan, 15-20 mg sample, at 20° C./min to 800° C. The samples were purged under a breathing quality air environment, at 40 ml/min. The sample was dried in a vacuum oven at 75° C., prior to testing. One of the samples was only done to 650° C., but is a repeated sample, the results are in FIG. 16.

Figure 17:
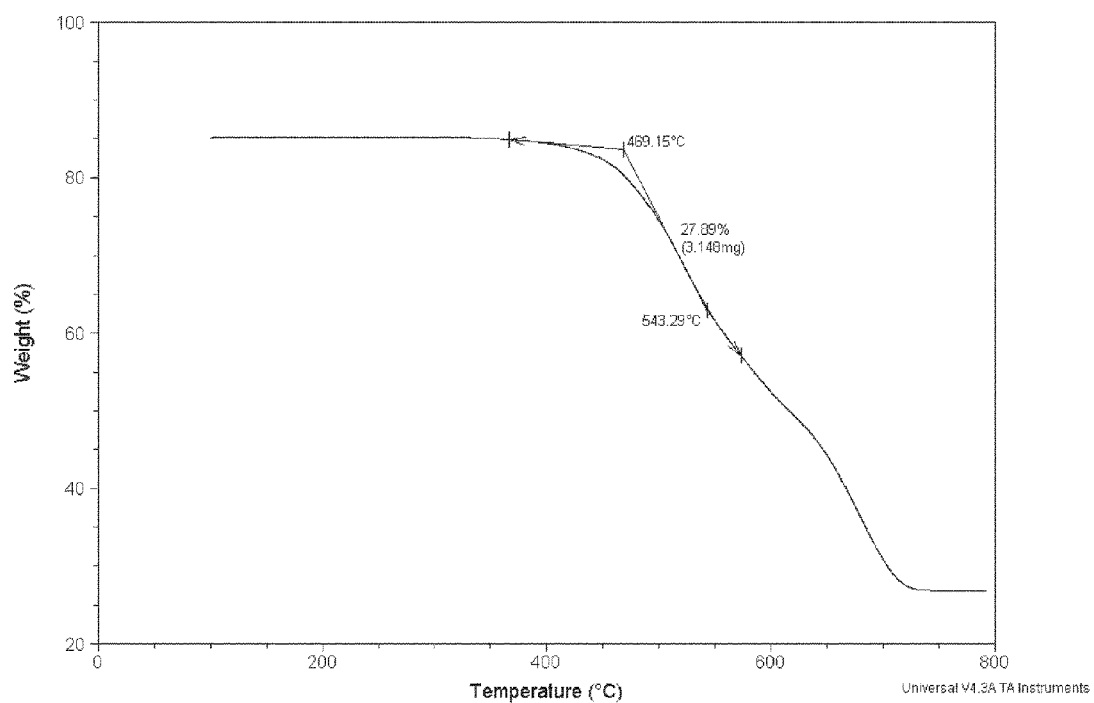

TGA results shows a slight increase in the degradation temperature with polymerization, 399 to 422° C. for the ester linked polymer. This is in contradiction to PDMS. The reason could be a resonance between the phenyl groups of the siloxane and the isophthalate. This trend continues with amide linked PDPS, see FIG. 17.

Amide, which is always more stable than ester, has a very high degradation temperature of 469° C. This occurs even though the molecular weight is only 3150.

PCFC:

PCFC, was done on a custom machine created for the FAA. PCFC samples were dried in a vacuum oven at 75° C. prior to testing. The samples were heated at a rate of 1° C./sec until 900° C., with a sample size of between two to five milligram. The results are in the table below, as well as the results for diphenylsiloxane before polymerization with isophthalate.

TABLE 4.4.1

PCFC Polidiphenyl siloxane ester-co-5-hydroxyisophthalate

| pan (mg) | sample (mg) | peak height (W/g) | integrated area (kJ/g) | heating rate (C/s) | pan + char (mg) | HR capacity (J/g·K) | total HR (kJ/g) | char yield (%) |
|---|---|---|---|---|---|---|---|---|
| 171.79 | 2.49 | 54.36 | 4.50 | 1.004000 | 172.71 | 54.1 | 4.50 | 36.9% |
| 170.87 | 2.16 | 66.31 | 11.30 | 0.997700 | 171.95 | 66.5 | 11.30 | 50.0% |
| 168.39 | 2.12 | 91.47 | 11.80 | 0.995600 | 170.03 | 91.9 | 11.80 | 77.4% |
|  |  |  |  |  |  | 70.8 | 9.2 | 54.8% |
|  |  |  |  |  |  | 19.2 | 4.1 | 20.6% |

TABLE 4.4.2

PCFC Polidiphenyl siloxane amino-co-5-amineisophthalate

| pan (mg) | sample (mg) | peak height (W/g) | integrated area (kJ/g) | heating rate (C/s) | pan + char (mg) | HR capacity (J/g·K) | total HR (kJ/g) | char yield (%) |
|---|---|---|---|---|---|---|---|---|
| 172.26 | 4.24 | 95.80 | 16.20 | 1.004000 | 174.27 | 95.4 | 16.20 | 47.4% |
| 171.88 | 4.55 | 97.73 | 16.20 | 1.004000 | 174.57 | 97.3 | 16.20 | 59.1% |

TABLE 4.4.2-continued

| | | | PCFC Polidiphenyl siloxane amino-co-5-amineisophthalate | | | | | |
|---|---|---|---|---|---|---|---|---|
| pan (mg) | sample (mg) | peak height (W/g) | integrated area (kJ/g) | heating rate (C/s) | pan + char (mg) | HR capacity (J/g · K) | total HR (kJ/g) | char yield (%) |
| 170.82 | 4.36 | 99.24 | 16.8 | 1.001 | 172.68 | 99.1 | 16.80 | 42.7% |
| | | | | | | 97.3 | 16.4 | 49.7% |
| | | | | | | 1.9 | 0.3 | 8.5% |

TABLE 4.4.3

| | | | Polidiphenyl siloxane no reaction | | | | | |
|---|---|---|---|---|---|---|---|---|
| pan (mg) | sample (mg) | peak height (W/g) | integrated area (kJ/g) | heating rate (C/s) | pan + char (mg) | HR capacity (J/g · K) | total HR (kJ/g) | char yield (%) |
| 169.19 | 2.42 | 97.88 | 16.20 | 1.006000 | 171.02 | 97.3 | 16.20 | 75.6% |
| 169.22 | 4.86 | 112.80 | 19.90 | 0.994400 | 172.12 | 113.4 | 19.90 | 59.7% |
| 170.54 | 2.66 | 91.95 | 19.1 | 0.994 | 171.37 | 92.5 | 19.10 | 31.2% |
| | | | | | Average: | 101.1 | 18.4 | 55.5% |
| | | | | | Std dev: | 11.0 | 1.9 | 22.5% |

The PCFC results shows a similar trend as the PDMS ester and amine, in that the ester polydiphenyl siloxane shows a lower heat release and a lower decomposition temperature as amine linked polydiphenyl siloxane. It is noted that the molecular weights are different however this is not expected to change the results of the PCFC test see section 4.0.

The teachings of all patents, published applications and references cited herein are incorporated herein by reference in their entirety.

EQUIVALENTS

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A crosslinked polymer characterized by a repeat unit represented by the following structural formula:

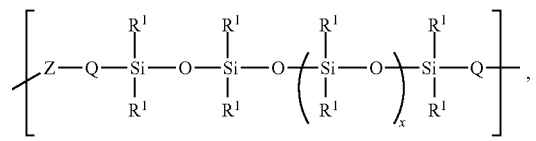

or a copolymer thereof, wherein:
the polymer is crosslinked with at least one crosslinking agent, wherein the crosslinking agent is hexamethylenetetramine;
at least one repeat unit of a first polymer strand is crosslinked with at least one repeat unit of a second polymer strand by at least one bridging unit;
each Q is an optionally substituted alkylene group that is optionally interrupted with one or more heteroatoms selected from the group consisting of oxygen and sulfur;
Z is —N($R^2$)—C(O)-$T^1$-G-E-G-$T^2$-C(O)—N($R^2$)— or —$X^1$—$B^1$—$X^2$—;
each G independently is a covalent bond, an optionally substituted aryl ring group, an optionally substituted heteroaryl ring group, an optionally substituted non-aromatic hydrocarbyl ring group, or an optionally substituted non-aromatic heterocyclic ring group;
E is a covalent bond, —O—, —S—, R', —O—R'—O—, —S—R'—S—, —C(O)—, —N(R)—, —N(R)C(O)— or —N(R)C(S)—;
each of $T^1$ and $T^2$ independently is a covalent bond or an alkylene group, or, taken together with N($R^2$)—C(O)—, forms a 5-14 membered non-aromatic heterocyclic group, provided that when both of $T^1$ and $T^2$ are covalent bond, at least one G is other than a covalent bond;
$B^1$ is an optionally substituted alkylene group that is optionally interrupted with one or more heteroatoms selected from the group consisting of oxygen and sulfur, or an optionally substituted aryl group;
each of $X^1$ and $X^2$ independently is O, S or NR;
each R independently is —H, an optionally substituted alkyl group or an optionally substituted aryl group;
each R' independently is an optionally substituted hydrocarbylene group;
each $R^1$ independently is —H, an optionally substituted alkyl group, an optionally substituted alkoxy group, an optionally substituted aryloxy group, or an optionally substituted aryl group;
each $R^2$ independently is —H, an optionally substituted alkyl group or an optionally substituted alkylcarbonyl group, or each $R^2$ independently, taken together with the nitrogen atom and the carbonyl group of —C(O)—N($R^2$)—, and together with $T^1$ or $T^2$, forms a 5-14 membered non-aromatic heterocyclic group optionally fused with G when G is other than a covalent bond; and each x is an integer of 1-50.

2. The crosslinked polymer of claim 1, wherein the polymer is crosslinked by the crosslinking agent in an amount of between about 0.5% and about 35% by weight based upon the weight of the non-crosslinked polymer.

3. The crosslinked polymer of claim 2, wherein the polymer is crosslinked with at least one linker unit selected from the group consisting of: alkylene groups and diaminoalkylene groups.

4. The crosslinked polymer of claim 2, wherein the linker unit is selected from the group consisting of: —(CH$_2$)$_r$—, —HN—(CH$_2$)$_r$—, and —HN—(CH$_2$)$_r$—NH—, wherein:

each r independently is, an integer from 2 to 20.

5. A crosslinked polymer characterized by a repeat unit represented by a structural formula selected from the group consisting of:

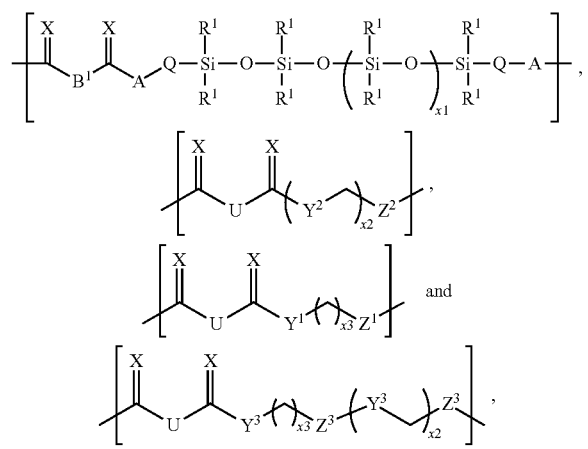

or a copolymer thereof, wherein:

the polymer is crosslinked with at least one crosslinking agent, wherein the crosslinking agent is hexamethylenetetramine;

at least one repeat unit of a first polymer strand is crosslinked with at least one repeat unit of a second polymer strand by at least one bridging unit;

each X independently is O or S;

each A independently is O or NR;

each Q is an alkylene group optionally interrupted with one or more heteroatoms selected from the group consisting of oxygen and sulfur;

each R$^1$ independently is —H, an optionally substituted alkyl group, an optionally substituted alkoxy group, an optionally substituted aryloxy group, or an optionally substituted aryl group;

each R independently is —H, an optionally substituted alkyl group or an optionally substituted aryl group;

B$^1$ is an optionally substituted alkylene group that is optionally interrupted with one or more heteroatoms selected from the group consisting of oxygen and sulfur, or an optionally substituted aryl group;

each U independently is an optionally substituted alkylene group that is optionally interrupted with one or more heteroatoms selected from the group consisting of oxygen and sulfur, or an optionally substituted aryl group;

each of Y$^1$, Y$^2$ and Y$^3$, independently, is O, S, NR;

each of Z$^1$, Z$^2$ and Z$^3$, independently, is O, S, NR; and each of x1, x2 and x3, independently, is an integer of 1 to 50.

6. The crosslinked polymer of claim 5, wherein the polymer is crosslinked by at least one crosslinking agent in an amount of between about 0.5% and about 35% by weight based upon the weight of the non-crosslinked polymer.

7. The crosslinked polymer of claim 6, wherein the crosslinking agent is in an amount of between about 1% and about 25% by weight based upon the weight of the non-crosslinked polymer.

8. The crosslinked polymer of claim 5, wherein the repeat unit is characterized by the following structural formula:

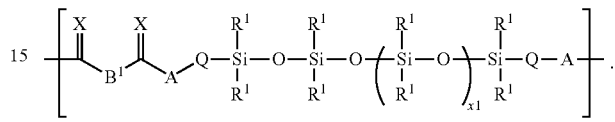

9. The crosslinked polymer of claim 8, wherein each R$^1$ is:

i) —H;

ii) an alkyl group optionally substituted with one or more substitutents selected from the group consisting of halogen, amino, lower alkylamino, lower dialkylamino, lower alkoxy, nitro, cyano, hydroxy, lower haloalkoxy, lower alkoxycarbonyl, lower alkylcarbonyl, lower haloalkyl, phenyl and lower phenylalkyl;

iii) an alkoxy group optionally substituted with one or more substitutents selected from the group consisting of halogen, amino, lower alkylamino, lower dialkylamino, lower alkoxy, nitro, cyano, hydroxy, lower haloalkoxy, lower alkoxycarbonyl, lower alkylcarbonyl, lower haloalkyl, phenyl and lower phenylalkyl;

iv) an aryloxy group optionally substituted with one or more substituents selected from the group consisting of halogen, lower alkyl, amino, lower alkylamino, lower dialkylamino, lower alkoxy, nitro, cyano, hydroxy, lower haloalkoxy, lower alkoxycarbonyl, lower alkylcarbonyl and lower haloalkyl; or v) an aryl group optionally substituted with one or more substituents selected from the group consisting of halogen, lower alkyl, amino, lower alkylamino, lower dialkylamino, lower alkoxy, nitro, cyano, hydroxy, lower haloalkoxy, lower alkoxycarbonyl, lower alkylcarbonyl and lower haloalkyl.

10. The crosslinked polymer of claim 9, wherein R is:

i) —H;

ii) an alkyl group optionally substituted with one or more substitutents selected from the group consisting of halogen, amino, lower alkylamino, lower dialkylamino, lower alkoxy, nitro, cyano, hydroxy, lower haloalkoxy, lower alkoxycarbonyl, lower alkylcarbonyl, lower haloalkyl, phenyl and lower phenylalkyl; or iii) an aryl group optionally substituted with one or more substituents selected from the group consisting of halogen, lower alkyl, amino, lower alkylamino, lower dialkylamino, lower alkoxy, nitro, cyano, hydroxy, lower haloalkoxy, lower alkoxycarbonyl, lower alkylcarbonyl and lower haloalkyl.

11. The crosslinked polymer of claim 10, wherein:

i) the alkylene group represented by B$^1$ is optionally substituted with one or more substitutents selected from the group consisting of halogen; amino; lower alkylamino; lower dialkylamino; lower alkoxy optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; nitro; cyano; hydroxy; carboxy;

lower alkoxy carbonyl; lower haloalkoxy; lower alkoxycarbonyl; lower alkylcarbonyl; aryl; and aralkyl;

ii) and the aryl group represented by $B^1$ is optionally substituted with one or more substitutents selected from the group consisting of halogen; lower alkyl optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; amino; lower alkylamin; lower dialkylamino; lower alkoxy optionally substituted with halogen, amino, phenyl, benzyl, lower alkylamino, lower dialkylamino, lower alkoxy, nitro, cyano, hydroxy, carboxy, lower alkoxy carbonyl, lower haloalkoxy, lower alkoxycarbonyl, lower alkylcarbonyl and lower haloalkyl; nitro, cyano, hydroxy; lower haloalkoxy; lower alkoxycarbonyl; lower alkylcarbonyl; and lower haloalkyl.

12. The crosslinked polymer of claim 8, wherein the polymer is crosslinked by the crosslinking agent at $B^1$.

13. The crosslinked polymer of claim 12, wherein the polymer is characterized by a repeat unit represented by the following structural formula:

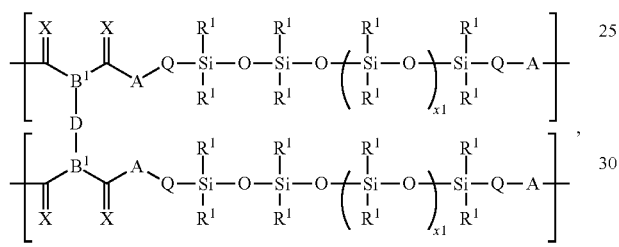

or a copolymer thereof, wherein D is a bridging unit which connects $B^1$ of a first polymer strand to $B^1$ of a second polymer strand.

14. The crosslinked polymer of claim 13, wherein D is selected from the group consisting of: an alkylene group and a diaminoalkylene group

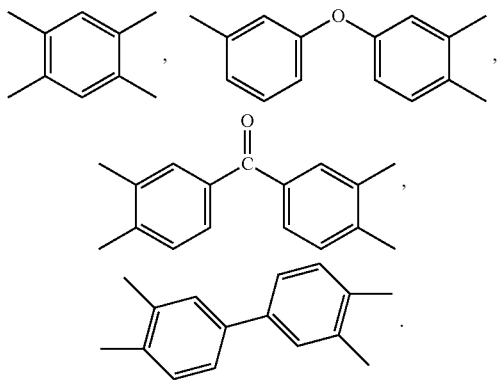

15. The crosslinked polymer of claim 14, wherein D is selected from the group consisting
of: —$(CH_2)_r$—, —HN—$(CH_2)_r$—,
and —HN—$(CH_2)_r$—NH—,
wherein:
each r independently is, an integer from 2 to 20.

* * * * *